United States Patent
Hutelmyer et al.

(10) Patent No.: US 12,341,788 B2
(45) Date of Patent: Jun. 24, 2025

(54) NETWORK SECURITY SYSTEMS FOR IDENTIFYING ATTEMPTS TO SUBVERT SECURITY WALLS

(71) Applicant: Target Brands, Inc., Minneapolis, MN (US)

(72) Inventors: Paul Hutelmyer, Minneapolis, MN (US); Adam Blake, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 241 days.

(21) Appl. No.: 17/993,641

(22) Filed: Nov. 23, 2022

(65) Prior Publication Data

US 2023/0239312 A1   Jul. 27, 2023

Related U.S. Application Data

(60) Provisional application No. 63/302,837, filed on Jan. 25, 2022.

(51) Int. Cl.
*H04L 9/40* (2022.01)

(52) U.S. Cl.
CPC ...... *H04L 63/1416* (2013.01); *H04L 63/1425* (2013.01)

(58) Field of Classification Search
CPC .............. H04L 63/1416; H04L 63/1425
See application file for complete search history.

(56) References Cited

U.S. PATENT DOCUMENTS

| | | | |
|---|---|---|---|
| 8,060,596 B1 * | 11/2011 | Wootton | G06F 21/6218 713/176 |
| 10,178,116 B2 | 1/2019 | Fujisawa et al. | |
| 10,326,778 B2 | 6/2019 | Gong et al. | |
| 10,375,101 B2 * | 8/2019 | Berger | H04L 63/1433 |
| 10,462,169 B2 | 10/2019 | Durairaj et al. | |
| 10,728,262 B1 | 7/2020 | Vaswani et al. | |
| 10,887,325 B1 | 1/2021 | Lin et al. | |
| 2008/0288330 A1 * | 11/2008 | Hildebrand | G06Q 10/06398 705/7.42 |

(Continued)

*Primary Examiner* — Trong H Nguyen
*Assistant Examiner* — Samikshya Poudel
(74) *Attorney, Agent, or Firm* — Barnes & Thornburg LLP

(57) ABSTRACT

Disclosed are techniques for monitoring and identifying attempts to subvert a security wall within a network infrastructure. A method can include receiving, by a network security system monitoring and protecting the network infrastructure, network activity for the network infrastructure, determining whether the network activity triggers at least one security event rule, blocking the network activity when the network activity triggers the rule, determining a sensitivity level associated with the network activity, starting a timer based on the sensitivity level satisfying a threshold level of sensitivity, continuously monitoring subsequent network activity until the timer expires, determining whether the subsequent network activity triggers one or more security event rules before the timer expires, associating the blocked network activity with the subsequent network activity if the subsequent network activity triggers the rules, and generating an alert indicating the associated network activity as an attempt to subvert a security wall within the network infrastructure.

20 Claims, 7 Drawing Sheets

(56) References Cited

U.S. PATENT DOCUMENTS

| | | | |
|---|---|---|---|
| 2013/0097701 A1* | 4/2013 | Moyle | H04L 63/1416 726/22 |
| 2016/0021056 A1* | 1/2016 | Chesla | G06F 21/56 726/11 |
| 2016/0306965 A1* | 10/2016 | Iyer | G06Q 10/0635 |
| 2017/0063894 A1* | 3/2017 | Muddu | G06F 16/9024 |
| 2018/0048666 A1* | 2/2018 | Alderson | H04L 45/02 |
| 2018/0115564 A1* | 4/2018 | Barak | H04L 63/145 |
| 2019/0166155 A1* | 5/2019 | Steele | H04L 63/1433 |
| 2019/0166159 A1* | 5/2019 | Avrahami | H04L 63/1483 |
| 2019/0266324 A1 | 8/2019 | Edwards et al. | |
| 2020/0137067 A1* | 4/2020 | Nambiar | G06F 21/554 |
| 2020/0336497 A1* | 10/2020 | Seul | H04L 63/0263 |
| 2022/0407893 A1* | 12/2022 | Maiman | H04L 63/205 |
| 2023/0231854 A1* | 7/2023 | Blake | H04L 63/1425 726/4 |

* cited by examiner

NETWORK SECURITY SYSTEMS FOR IDENTIFYING ATTEMPTS TO SUBVERT SECURITY WALLS

CROSS-REFERENCE TO RELATED APPLICATIONS

This application claims priority to U.S. Provisional Application Ser. No. 63/302,837, filed on Jan. 25, 2022, the disclosure of which is incorporated by reference in its entirety.

TECHNICAL FIELD

This document generally describes devices, systems, and methods related to computer network security, such as monitoring network activity and identifying attempts to subvert a security wall.

BACKGROUND

Network security includes policies, practices, and devices adapted to monitor and prevent unwanted access, misuse, modification, or attacks on computer networks and network-accessible resources. Network security involves differentiating and restricting between authorized and unauthorized access to data and services in a network, which can be controlled by one or more authentication schemes. Malicious actors are users that are not authorized to access the network (or particular data and resources of the network) but who nevertheless attempt to circumvent the network's implemented security controls in order to gain access to the network, either by thwarting network security measures or circumventing them by, for example, getting an authorized user to unwittingly perform actions that provide malicious actors with access. For example, malicious actors may either directly attempt to thwart network security measures, such as through an arbitrary execution exploit, or indirectly attempt to gain access through an authorized user, such as through a phishing scheme. Sometimes, malicious actors can come from within an enterprise and can exploit the enterprise's network to their advantage and/or for malicious purposes.

Network security can include proactive and reactive security measures that either block security threats before they exploit a security vulnerability, or the security measures are deployed once the vulnerability has been exploited to mitigate the exploit. Such proactive and reactive security measures can be performed automatically and/or manually, such as by security analysts who are experts in identifying and eliminating security threats in a network. Security analysts can perform a variety of tasks, such as investigating potential security vulnerabilities and instances of potential malicious attacks, differentiating between benign and malicious network activity, and formulating response strategies when malicious attacks are found.

SUMMARY

The document generally relates to technology to identify attempts to subvert a security wall within an enterprise environment. For example, the disclosed technology can be used to identify, assess, and prevent/respond to security threats within the enterprise environment, such as users within the enterprise environment (e.g., computer network and infrastructure used by entity, such as company) being blocked or restricted from performing some action and then attempting an alternate method to perform the action to get around (subvert) the block/restriction. More specifically, the disclosed techniques provide a network security system for determining indicators of suspicious activity, such as attempts to work around security walls (e.g., blocks) within the enterprise, based on monitoring and assessing network activity. Indicators of risk to the enterprise can be identified, for example, based on monitoring changes in user behavior over time that indicate a user has attempted to subvert the security wall, which may trigger one or more security rules in the network security system. Identifying additional user behavior during some period of time following the first subversion that triggers additional security rules can indicate that the user poses a threat to the enterprise.

For example, a user can be blocked from accessing data or a particular website from a user device within the enterprise environment but may nevertheless attempt to get around this security wall within some period of time after being blocked. The network security system may identify that the security wall has been hit a first time and then can monitor subsequent network activity over some period of time to look for additional behavior (e.g. actions) indicative of an attempt to subvert the security wall a second time. If the additional behavior is identified within the period of time, the network security system can identify that the user likely poses a security threat to the enterprise. The network security system can also associate the first behavior and the additional behavior with a user or group of users in the enterprise. The network security system can also generate an alert that can be transmitted to a user device of a security analyst and used to identify, monitor, and/or apprehend the user. The network security system may also respond to the additional behavior by preventing the user from continuing their suspicious behavior.

The disclosed techniques can also provide for differentiating between nefarious attempts to get around the security wall and benign actions that are more likely unintentional user errors. The network security system can, for example, identify a nefarious attempt to get around the security wall as a combination of (i) network activity that triggers a security rule and has some predefined level of sensitivity (e.g., the activity is associated with a sensitive file type, the activity is associated with a user in the enterprise who has privileges to access confidential information, etc.) and (ii) subsequent network activity that triggers another security rule (or the same security rule) and occurs within some predefined amount of time after the first network activity was identified.

One or more embodiments described herein can include a method for monitoring and identifying attempts to subvert a security wall within a network infrastructure, the method including: receiving, by a network security system monitoring and protecting the network infrastructure, network activity for the network infrastructure that includes information identifying a user device from which the network activity originates, determining, by the network security system, whether the network activity triggers at least one security event rule in a group of security event rules, blocking, by the network security system, the network activity based on a determination that the network activity triggers the at least one security event rule, determining, by the network security system, a sensitivity level associated with the network activity based, at least in part, on the network activity, starting, by the network security system, a timer based on the sensitivity level satisfying a threshold level of sensitivity, continuously monitoring, by the network security system, subsequent network activity until the timer expires, determining, by the network security system, whether the subsequent network activity triggers one or more security event rules in the group of security event rules before the timer expires, associating, by the network security system, the blocked network activity with the subsequent network activity based on a determination that the subsequent network activity triggers the one or more security event rules before the timer expires, and generating, by the network security system, an alert indicating that the associated network activity is an attempt to subvert a security wall within the network infrastructure.

In some implementations, the embodiments described herein can optionally include one or more of the following features. For example, the method can include determining, by the network security system and based on a determination that the sensitivity level associated with the network activity does not satisfy the threshold level of sensitivity, whether the network activity triggers a quantity of security event rules in the group of security event rules that exceeds a threshold amount. The method can also include starting, by the network security system, the timer based on the quantity of security event rules exceeding the threshold amount.

In some implementations, the threshold level of sensitivity can be based on at least one of a file type, content in a file, a file size, a sensitivity type of data associated with a file, and a user associated with a file that corresponds to the network activity. The method can include determining, by the network security system, that the sensitivity level associated with the network activity satisfies the threshold level of sensitivity based on a file corresponding to the network activity having a sensitive file type, wherein the sensitive file type includes at least a zip file. The method can also include determining, by the network security system, that the sensitivity level associated with the network activity satisfies the threshold level of sensitivity based on a file corresponding to the network activity having sensitive information, the sensitive information including at least one of confidential language, financial information, proprietary software code, sensitive business plans, customer data, and personal data. The method may include determining, by the network security system, that the sensitivity level associated with the network activity satisfies the threshold level of sensitivity based on a file corresponding to the network activity having (i) a file type that satisfies a file type threshold and (ii) a size that exceeds a threshold file size. The method may also include determining, by the network security system, that the sensitivity level associated with the network activity satisfies the threshold level of sensitivity based on a file corresponding to the network activity being associated with a sensitive area in the network infrastructure, the sensitive area including at least one of human resources, finance, and customer information. The method may include determining, by the network security system, that the sensitivity level associated with the network activity satisfies the threshold level of sensitivity based on a user associated with the network activity having at least a user risk score that exceeds a threshold risk score.

As another example, the method can include blocking, by the network security system, the subsequent network activity based on a determination that the subsequent network activity triggers the one or more security event rules. The method can include adding, by the network security system, the associated activity to a case file that corresponds to a user. The method may also include transmitting, by the network security system, the alert to a computing device of a security analyst of the network infrastructure, the computing device being configured to receive user input indicating an action to take in response to the alert.

In some implementations, the one or more security event rules can include a virtual machine (VM) rule, and determining, by the network security system, whether the subsequent network activity triggers the one or more security event rules can include analyzing information associated with the subsequent network activity to identify a number of hops between the user device and a destination device, determining whether the number of hops exceeds a threshold level, and determining that the subsequent network activity triggers the VM rule based on a determination that the number of hops exceeds the threshold level.

In some implementations, the one or more security event rules can include a proxy rule, and determining, by the network security system, whether the subsequent network activity triggers the one or more security event rules can include: analyzing information associated with the subsequent network activity to determine whether a file associated with the subsequent network activity is similar to a file associated with the blocked network activity, identifying that the file is being sent to a computing device of an unauthorized recipient via a proxy based on a determination that the file associated with the subsequent network activity is similar to the file associated with the blocked network activity, the proxy being at least one of a file sharing system, a personal email service, malware, and a local network-attached storage (NAS), and determining that the subsequent network activity triggers the proxy rule based on an identification that the file is sent via the proxy.

In some implementations, the one or more security event rules can include a local data storage device rule, and determining, by the network security system, whether the subsequent network activity triggers the one or more security event rules can include: analyzing information associated with the subsequent network activity to determine whether a file associated with the subsequent network activity is similar to a file associated with the blocked network activity, identifying that the file is being downloaded to a local data storage device based on a determination that the file associated with the subsequent network activity is similar to the file associated with the blocked network activity, the blocked network activity being an attempt to download the file to the user device, and determining that the subsequent network activity triggers the local data storage device rule based on an identification that the file is being downloaded to the local data storage device. The local data storage device can be at least one of a thumb drive, a USB drive, a hard drive, and a cloud-based storage system.

In yet some implementations, the one or more security event rules can include an email rule, and determining, by the network security system, whether the subsequent network activity triggers the one or more security event rules can include: analyzing information associated with the subsequent network activity to determine whether a file associated with the subsequent network activity is similar to a file associated with the blocked network activity, identifying that the file is being sent via a personal email service to an unknown email address based on a determination that the file in the subsequent network activity is similar to the file associated with the blocked network activity, the blocked network activity being an attempt to send the file via an email service within the network infrastructure, and determining that the subsequent network activity triggers the email rule based on an identification that the file is being sent via the personal email service. Sometimes, the unknown email address may (i) not be an email address known within the network infrastructure or (ii) not be a recipient of emails from other users in the network infrastructure.

In some implementations, the blocked network activity was an attempt to send the file by a first user using the email service within the network infrastructure and the subsequent network activity was an attempt to send the file by a second user using the personal email service.

One or more embodiments described herein can include a system for monitoring and identifying attempts to subvert a security wall within a network infrastructure, the system having: at least one processor and a memory device storing instructions that are operable, when executed by the at least one processor one or more computers, to cause the at least one processor to perform operations including: receiving network activity for the network infrastructure that includes information identifying a user device from which the network activity originates, determining whether the network activity triggers at least one security event rule in a group of security event rules, blocking the network activity based on a determination that the network activity triggers the at least one security event rule, determining a sensitivity level associated with the network activity based, at least in part, on the network activity, starting a timer based on the sensitivity level satisfying a threshold level of sensitivity, continuously monitoring subsequent network activity until the timer expires, determining whether the subsequent network activity triggers one or more security event rules in the group of security event rules before the timer expires, associating the blocked network activity with the subsequent network activity based on a determination that the subsequent network activity triggers the one or more security event rules before the timer expires, and generating an alert indicating that the associated network activity is an attempt to subvert a security wall within the network infrastructure.

In some implementations, the embodiments described herein can optionally include one or more of the abovementioned features. Moreover, in some implementations, the system can be a network security system that can monitor and protect the network infrastructure.

The devices, system, and techniques described herein may provide one or more of the following advantages. For example, monitoring network activity using a combination of security rules and time-based assessment of additional network activity can beneficially provide robust insight and analysis into whether and how users transition from one form of exfiltration to another. As a result, users can be identified as threats to the enterprise, repeat offenders can be identified, and the enterprise can plan and create appropriate responses to various types of security threats.

Analysis of a user's transition from one form of exfiltration to another can provide insight into whether the user is engaging in an intentionally threatening activity or whether the user has made an unintentional error. This analysis can be beneficial to identify which users may pose real threats to the enterprise. This analysis may also be beneficial to identify how much of a threat the user poses to the enterprise.

Analysis of users' transition from one form of exfiltration to another can also provide insight about what forms of exfiltration are being used so that the enterprise can respond appropriately to these and future security threats.

The disclosed techniques can also provide for aggregating information from different security rules that have been triggered by network activity to make meaningful associations and insights about users in the enterprise and the potential security threats they may pose to the enterprise. The disclosed techniques can also provide for combining and stitching together suspicious network activity and correlating the activity with a particular user device and/or user, which can be beneficial to provide robust endpoint security in the enterprise. As a result, the enterprise can accurately and effectively assess which users may pose a threat at a present time, how the users attempt to avoid the security wall of the enterprise, and what type of threat(s) the users may pose to the enterprise.

As another example, the disclosed techniques can weave together different actions of a user and add context to a group of those interrelated actions to generate a more cohesive view of risk that the user may pose to the enterprise. Therefore, instead of focusing merely on risk that the user may pose in singular events, the disclosed techniques provide a comprehensive approach for determining whether the user poses an actual risk to the enterprise, and the intent of the user to work around a security policy in the enterprise. As an example, a user who attempts to write a document to a personal flash drive may be blocked and notified, but then may try to get around this control by renaming the document and/or emailing the document to their personal email address. Beyond the user's initial attempt, which resulted in a block, the user's subsequent actions, when woven together with the initial attempt, provide further insight into a concerted and intentional effort of the user to exfiltrate the document knowing that the controls in the enterprise (e.g., the security policy) would not allow that document to leave the enterprise. As a result, the disclosed techniques can be used to accurately detect insider threats in the enterprise.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document generally relates to a network security system providing endpoint security for identifying security threats in an enterprise by monitoring network activity, identifying an attempt to subvert a security wall of the enterprise, continuously monitoring network activity for a period of time following the subversion attempt, and, based on identifying a second attempt to subvert the security wall within the period of time, determining that a user associated with the attempts to subvert the security wall poses a threat to the enterprise. Various security rules can be created and used by the network security system to monitor network activity and trigger upon detection of attempts to subvert the security wall. Use of the security rules in combination with monitoring of network activity can provide for robust insight into who poses a threat to the enterprise and what exfiltration techniques or other nefarious activities represent security threats to the enterprise. As a result, the network security system, security analysts, and other relevant users in the enterprise may thwart network activity that threatens the enterprise and/or proactively respond to suspicious activity at a present and/or future time.

Figure 1:
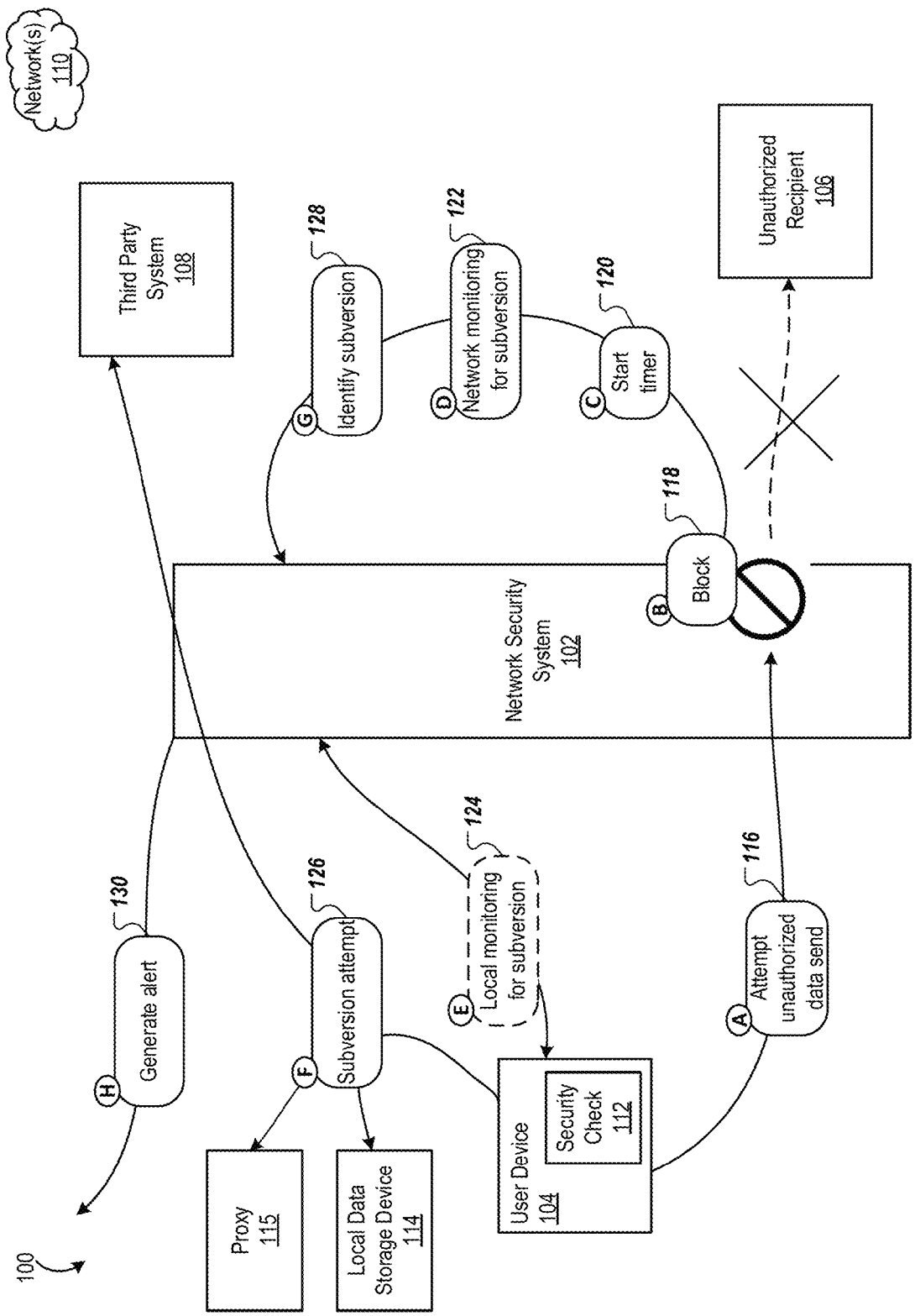
FIG. 1 is a conceptual diagram of a network security system for identifying attempts to subvert a security wall in an enterprise.

Referring to the figures, FIG. 1 is a conceptual diagram of a network security system 102 for identifying attempts to subvert a security wall in an enterprise 100. Computing systems and/or devices such as the network security system 102, a user device 104, an unauthorized recipient 106, a third party system 108, a local data store device 114, and a proxy 115 can be in communication (e.g., wired and/or wireless) via network(s) 110. One or more of the components 102, 104, 106, 108, 114, and/or 115 can be part of a local area network (LAN) of the enterprise 100. One or more of the components 102, 104, 106, 108, 114, and/or 115 may also be external or outside of the enterprise 100.

Figure 5A:
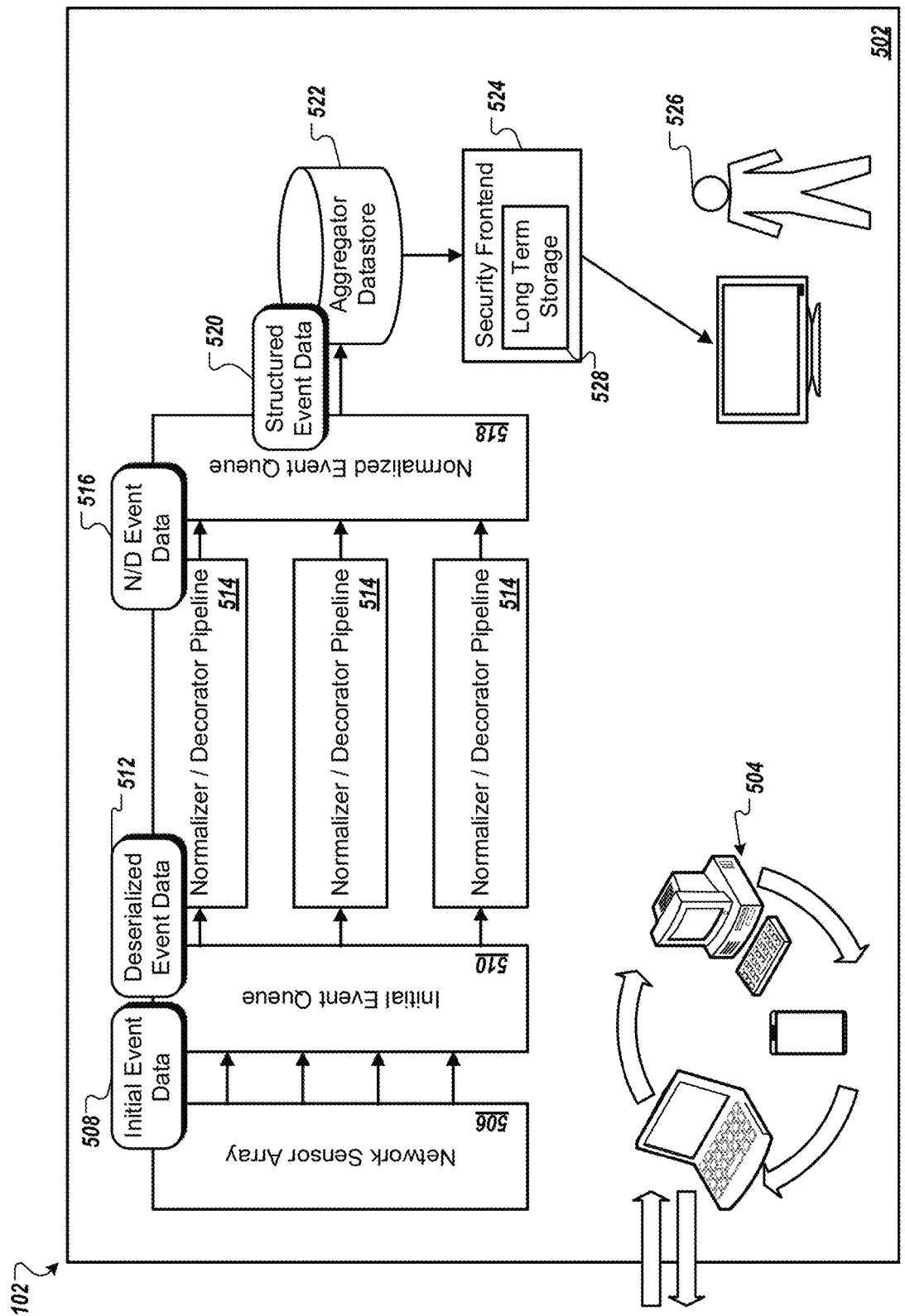
FIGS. 5A-B are block diagrams of an example system for generating events in response to network activity.
Figure 5B:
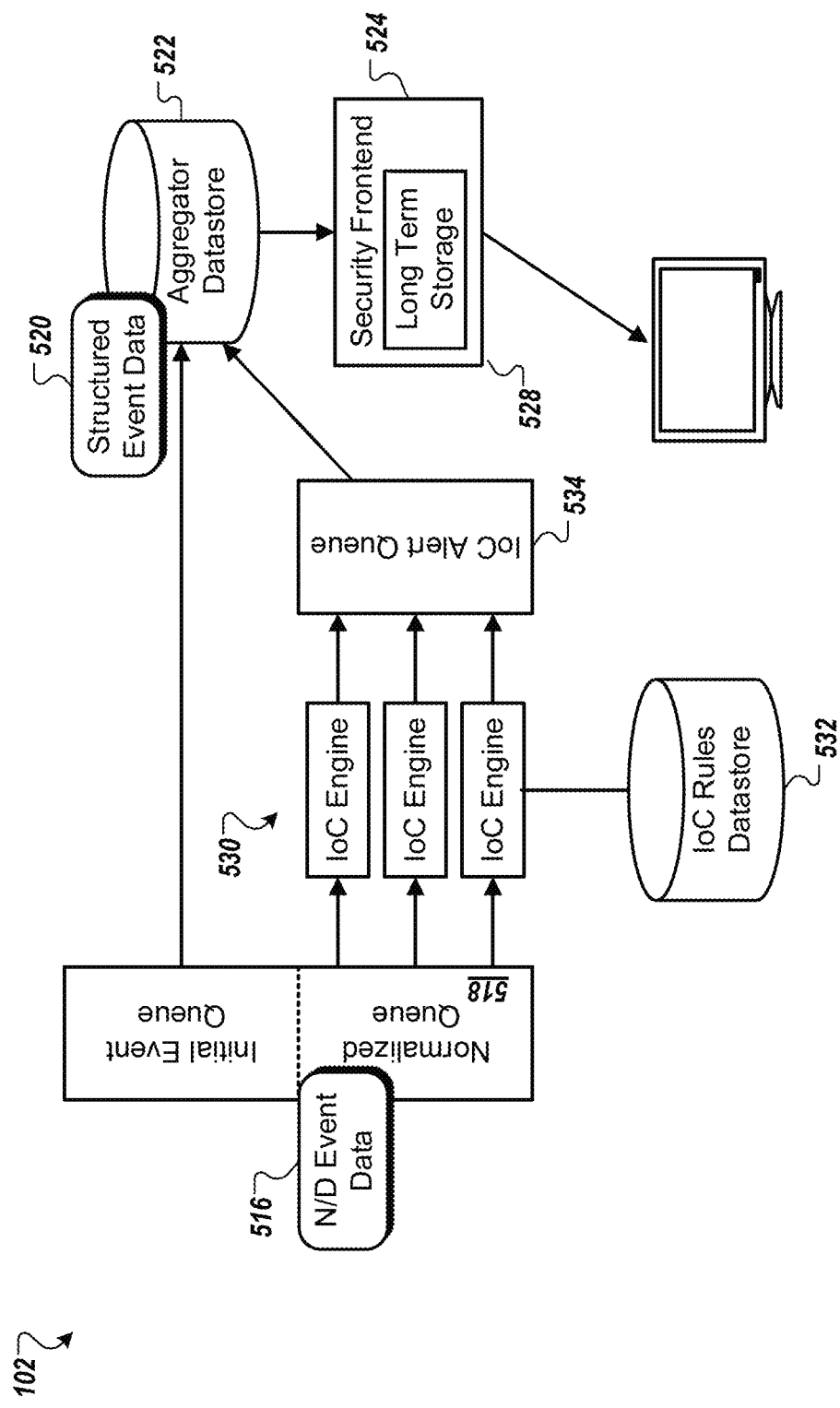

In brief, the network security system 102 can be deployed in the enterprise 100 to provide security monitoring and/or response capabilities. The system 102 can be a computing system at the enterprise 100 or remote from the enterprise 100. The system 102 may also be a cloud-based system and/or service. The system 102 can monitor incoming and/or outgoing network activity and identify potential and/or actual security threats to the enterprise 100. The system 102 can, for example, apply one or more security rules to network activity in order to determine whether the network activity is likely indicative of a security threat or vulnerability. Refer to FIGS. 5A-B for additional discussion about monitoring network activity.

The user device 104 can be any type of computing device (e.g., computer, tablet, laptop, smartphone, mobile phone, etc.) that can be used by a user associated with the enterprise 100, such as an employee. The user device 104 can be a corporate device, which may be owned by the enterprise 100 and provided to an employee, such as an enterprise-owned laptop. The user device 104 can also be a personal device that the employee may bring to an enterprise environment to perform functions of the employee's role in the enterprise 100. The personal device, for example, can connect to various systems and other computing devices of the enterprise 100 via the network(s) 110. The user device 104 can have a security check 112 installed thereon. The security check 112 can be provided by the network security system 102 in order to monitor ingoing and outgoing network activity associated with the user device 104. The security check 112 can also be provided by another network security system and/or cloud-based security service(s).

The unauthorized recipient 106 can be a computing device, system, and/or cloud-based service that is not part of the enterprise 100 and/or is not authorized to receive whatever information may be transmitted to it by the user device 104. For example, the unauthorized recipient 106 can be part of the enterprise 100 but may not have access rights to confidential information. Nevertheless, the user device 104 can attempt sending the confidential information to the unauthorized recipient 106. As another example, the unauthorized recipient 106 can be used by a malicious user who is working with the employee of the user device 104. The malicious user may not be part of the enterprise 100. Regardless of the type of information that the user device 104 transmits to the unauthorized recipient 106, the malicious user would be an unauthorized recipient.

The third party system 108 can be any computing device, system, and/or cloud-based service that is not part of the enterprise 100 and/or is not authorized to receive whatever information may be transmitted by the user device 104. For example, the third party system 108 can be a cloud-based file sharing or transferring system. In some implementations, the unauthorized recipient 106 and the third party system 108 can be a same system, device, and/or cloud-based service. In some implementations, the unauthorized recipient 106 and the third party system 108 can be different. As an illustrative example, the unauthorized recipient 106 can be a user device of the malicious user described above. The employee at the user device 104 may attempt sending an internal file of the enterprise 100 to the unauthorized recipient 106. When this attempt is blocked by the network security system 102, the employee at the user device 104 can then try sending the internal file to the unauthorized recipient 106 via the third party system 108, which can be a cloud-based file transfer system.

The local data storage device 114 can be a storage device that can be connected to computing devices and/or systems. For example, the local data storage device 114 can be a USB storage device or another type of external hard drive that can be connected and disconnected from devices such as the user device 104. The local data storage device 114 may also be a cloud-based data store/service, in some implementations. As an illustrative example, if the employee at the user device 104 is blocked by the network security system 102 from sending information to the unauthorized recipient 106, the employee may try uploading or saving the information to the local data storage device 114. The employee can then share the local data storage device 114 with the unauthorized recipient 106 so that they can receive the information.

The proxy 115 can be any type of firewall, computing system, server, and/or router that can act as an intermediary between one or more computing systems and/or devices. In some implementations, for example, the proxy 115 can be a virtual machine (VM) that can be spun up at the user device 104 and used to mask activities performed by the user device 104, such as transmitting information to the unauthorized recipient 106. Therefore, the employee at the user device 104 can attempt sending the information to the unauthorized recipient 106 through the proxy 115. As another example, the proxy 115 can be a tool such as a file sharing system. Therefore, in some implementations, the proxy 115 can be the same as the third party system 108.

Still referring to FIG. 1, the user device 104 can attempt an unauthorized data send in step A (116). The employee, for example, may attempt sending confidential information to the unauthorized recipient 106 via the employee's work email. As mentioned above, the security check 112 allows the network activity associated with the user device 104 to be monitored by the network security system 102. Therefore, when the user device 104 attempts the unauthorized data send in step A (116), the network security system 102 can block the attempted data send to the unauthorized recipient 106 (step B, 118).

Figure 2:
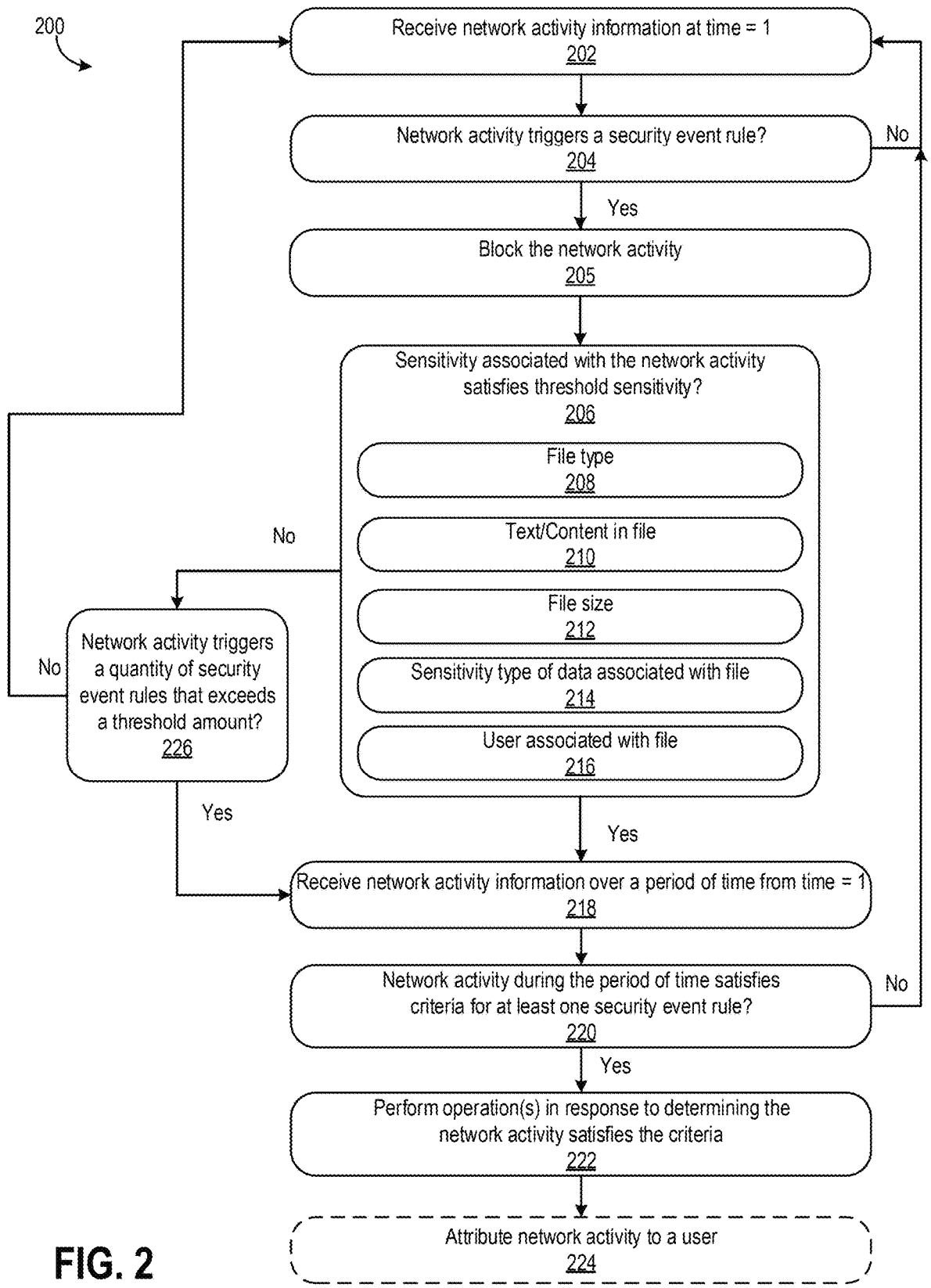
FIG. 2 is a flowchart of a process for identifying attempts to subvert a security wall in an enterprise.
Figure 3:
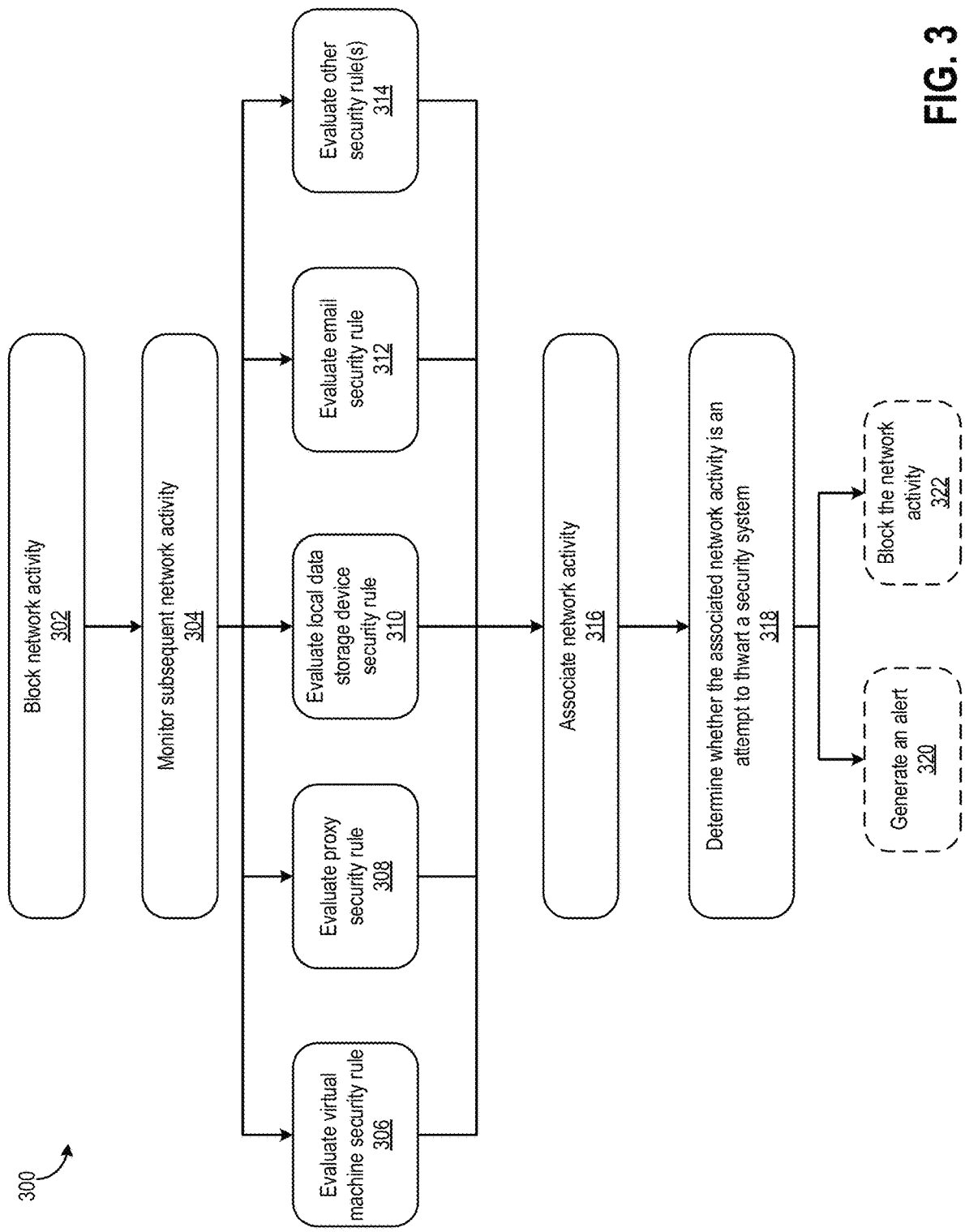
FIG. 3 is another flowchart of a process for identifying attempts to subvert a security wall in an enterprise.

The network security system 102 can determine that the data send should be blocked by evaluating information associated with the data send against one or more security rules. The security rules can be used to assess whether network activity poses, or potentially poses, a security threat to the enterprise 100. If one or more of the security rules are satisfied, then the attempted data send can be blocked (step B, 118). Refer to FIGS. 2-3 for additional discussion on evaluating the security rules.

As an illustrative example, the network security system 102 can evaluate the attempted data send over the work email against an email security rule. Under this rule, network activity can be considered a security threat if an email is being sent to an email address that is unknown in the enterprise 100 (e.g., the email address of someone who is not an employee and is not assigned an enterprise email, other employees in the enterprise have not received or sent emails to the email address, etc.). Here, the email address of the unauthorized recipient 106 may be unknown, thus satisfying the email security rule. As a result, the network security system 102 can block the email from being sent from the user device 104 to the unauthorized recipient 106.

Once the attempted data send is blocked, the network security system 102 can start a timer in step C (120). The timer can be started so that the user device 104's network activity can be monitored for some period of time. If, within some period of time since the timer started, additional network activity is identified that appears to be an attempt to get around the block of step B (118) (e.g., the employee tries one or more other ways to transmit the data to the unauthorized recipient 106, and potentially is successful in doing so, within some window of time), then the network security system 102 can determine that the employee of the user device 104 poses a security threat to the enterprise 100. In some implementations, the period of time can be six hours since the timer started. One or more other periods of time can be used, including but not limited to two hours, four hours, five hours, eight hours, ten hours, twelve hours, twenty-four hours, etc. The period of time can depend, for example, on information associated with the data that the user device 104 attempted to transmit to the unauthorized recipient in step A (116).

Accordingly, while the timer is running, the network security system 102 can perform network monitoring to identify potential subversion of the security wall by the user device 104 (step D, 122). Optionally, this may include local monitoring of the user device 104 via the security check 112 (step E, 124).

The user device 104 can make one or more subversion attempts in step F (126), which can occur while the timer is running. For example, the user device 104 can attempt uploading the data to the local data storage device 114. As another example, the user device 104 can attempt sending the data to the unauthorized recipient 106 via the proxy 115. As yet another example, the user device 104 can attempt sending the data to the unauthorized recipient 106 via the third party system 108.

Any of these subversion attempts can be monitored in the network activity by the network security system 102 to identify a subversion of the security wall (step G, 128). Similar to step B (118), the network security system 102 can determine whether any of the monitored network activity satisfies one or more security rules within the period of time from which the timer started. Evaluation of the security rules can occur continuously and in parallel with each other. If any of the security rules are satisfied within the period of time from which the timer started, the network security system 102 can identify the subversion attempt in step G (128). The network security system 102 can also associate the subversion attempt and/or the first attempted unauthorized data send with the user device 104.

The network security system 102 can also generate an alert about the identified subversion attempt by the user device 104 (step H, 130). The alert can indicate the initial attempted data send and the subversion attempt(s) that were later used by the user device 104. The alert can also identify the user device 104, such as by an IP address or other unique identifier.

The alert can be transmitted to a user device of a security analyst or relevant user in the enterprise 100 who is in charge of maintaining and monitoring security in the enterprise 100. The security analyst or relevant user can then use the alert to make a decision about how to respond to the security threat posed by the employee of the user device 104. As illustrative examples, the security analyst can decide to remove certain access privileges from the employee so that the employee cannot access the data that they attempted to send to the unauthorized recipient 106. The security analyst can also decide to fire the employee, add additional security measures to the user device 104, monitor network activity associated with the user device 104 more closely, etc.

The alert can also be added to a case file associated with the employee of the user device 104. Thus, the alert can provide more context for the security analysts who analyze and monitor employees who pay pose security threats to the enterprise 100. The disclosed techniques can provide for combining and stitching together suspicious network activity and correlating the activity with a particular user device and/or a particular employee, which can be beneficial to provide robust endpoint security in the enterprise 100.

FIG. 2 is a flowchart of a process 200 for identifying attempts to subvert a security wall in an enterprise. The process 200 can be used to determine whether a user, such as an employee of the enterprise, attempts to breach, avoid, or otherwise get around a security system that is in place in the enterprise. A series of one-off security rules can be executed in parallel and used to determine whether the user is attempting to subvert the security wall, thereby posing a security threat to the enterprise. The process 200 can be performed to build out cases of what type of activity may be used to subvert the security wall so that a network security system of the enterprise can use security rules that more closely monitor particular types of activities. As a result, the process 200 can be used to build out dynamic security rules that can be used to effectively monitor and respond to network activity that may pose security threats to the enterprise.

The process 200 can also be used to lower thresholds for some security rules or other blocking mechanisms that may be used by the enterprise to more effectively respond to techniques that are used by users to subvert the security wall. For example, if users are frequently attempting to subvert the security wall by executing malicious software on corporate devices, a threshold for a security rule intended to respond to such activity (e.g., monitor and/or block such activity) can be lowered, thereby making the security rule more sensitive and effective in responding to this type of activity. The process 200 can beneficially provide for tailoring a network security system for a particular enterprise environment. The process 200 can also beneficially provide for a network security system that is dynamically adjustable to changing activities monitored in the particular enterprise environment.

The process 200 can be performed by the network security system 102. The process 200 can also be performed by one or more other computing systems, devices, computers, networks, cloud-based systems, and/or cloud-based services. For illustrative purposes, the process 200 is described from the perspective of a computer system.

Referring to the process 200, the computer system can receive network activity information at time=1 (block 202). The network activity information can include some type of identifier (e.g., IP address or other network ID) that can identify the network activity. The network activity information can be associated with a particular user device, such as the user device 104 described in FIG. 1, via an IP address or other network ID. In some implementations, the network activity information can be associated with a particular user in the enterprise, for example via user account information, an email address, or other objective identifier of the user. Refer to FIGS. 5A-B for additional discussion about collecting, monitoring, and identifying network activity.

The computer system can determine whether the network activity triggers a security event rule in block 204. As described throughout this disclosure (e.g., refer to process 300 in FIG. 3), the computer system can execute one or more security event rules in parallel. Such rules can be continuously evaluated against the network activity to determine whether any of the network activity satisfies one or more of the rules. Network activity that satisfies a rule may be indicative of an attempt to subvert the security wall of the enterprise.

Each security event rule can be sensitive to a different type of network activity and/or a different aspect of network activity. As an illustrative example, network activity may satisfy a file-sharing rule if a user in the enterprise attempts to email a file having a size that exceeds some file size threshold value. Similarly, network activity may satisfy a file extension rule if the user attempts to email, share, download, etc. a file of a particular, predetermined file type. In both scenarios, the network activity may be indicative of an attempt by the user to subvert the security wall. Therefore, the network activity can be more closely monitored within some period of time following the first network activity to determine whether the user attempts another activity to subvert the security wall, which would indicate that the user (and/or their particular activity) poses a security threat to the enterprise and that the first activity was not merely an error or mistake of the user.

If a security event rule is not triggered, then the computer system can return to block 202 and continuously monitor network activity. If a security event rule is triggered, then the computer system can block the network activity in block 205. Blocking the network activity can include preventing the particular activity from being completed. Sometimes, the initiating user can receive a notification, alert, or other type of message at their device indicating that their activity was blocked. As an illustrative example, the user can attempt sending a large file via their work email to an unknown recipient (e.g., an email address that is not an internal, enterprise email). The email can be bounced back to the user and thus not send to the unknown recipient. The user may also receive a notification in their inbox that the email failed to send. In some implementations, the user may not receive a message indicating that their attempted activity was blocked.

The computer system can then determine whether a sensitivity of the blocked network activity satisfies a threshold level of sensitivity in block 206. Sensitivity of the blocked network activity can indicate a level of scrutiny and/or monitoring that should be given to the blocked activity. Sensitivity of the blocked activity can also be used to determine whether network activity should be more closely monitored to identify whether the associated user is in fact attempting to subvert the security wall of the enterprise.

Sensitivity can be assessed based on file type (block 208), text and/or content in the file (block 210), file size (block 212), sensitivity type of data associated with the file (block 214), and/or a user associated with the file (block 216). In some implementations, the computer system can assess sensitivity of the network activity before blocking the activity in block 205. Therefore, if the sensitivity associated with the network activity exceeds some threshold level, the computer system can block the activity.

The computer system can assess the particular activity that triggered the security event rule to determine its corresponding degree of sensitivity. In some implementations, if the security event rule corresponds to sensitive information, such as financial information, customer information, propriety software code, legal documents, key business decision plans, or other private/personal information, then triggering (e.g., satisfying) that rule can be sufficient for the computer system to determine that the sensitivity exceeds the threshold level. Other times, various aspects of the network activity can be assessed to determine sensitivity. By doing so, sensitivity can be assessed on a file-level rather than as a comparison of one user to another in the enterprise.

For example, sensitivity can be assessed based on file type (block 208). Certain file types can be defined by security event rules as having higher sensitivity. For example, zip files may be categorized as sensitive file types. Non-standard file types, such as a file type of ".adam" may also result in high sensitivity associated with the network activity. As another example, files that are password protected may also trigger a determination of high sensitivity for the associated network activity.

Additionally or alternatively, sensitivity can be assessed based on text and/or content in the file (block 210). Certain text or other content can be defined by security event rules as having higher sensitivity. For example, any file that has text that reads "Confidential" or "Internal Use Only" can be considered sensitive or some higher degree of sensitivity. Accordingly, a PowerPoint file with "Confidential" in text at the bottom of each slide can make the entire file high sensitivity and thus higher risk. In some implementations, score values can be assigned to the file to define a level of sensitivity associated with that file. For example, the file can be assigned a value on a sliding scale (e.g., 1 to 10, 1 to 100, or any other scale). Each increasing severity of confidentiality or importance in a particular file or type of file(s) to the enterprise can be scored individually and/or differently (e.g., more weight and higher sensitivity scores can be given to internal files that have personal information versus internal files that do not have personal information). Furthermore, scoring a sensitivity metric may impact an overall risk score associated with the network activity. A higher sensitivity score can, for example, increase the overall risk score associated with the network activity. One or more sensitivity score adjustments can also be implemented (e.g., increasing the score or lowering the score) based on identifying different types of subsequent activities with the file. For example, if a user attempts to scrub or remove keywords indicative of sensitivity from portions of the file, then the sensitivity score can increase by some predetermined amount, which, in turn, can cause the overall risk score associated with the network activity to also increase by some predetermined amount. Such activity can indicate concerted efforts and intent of the user to work around the enterprise's security policy.

Additionally or alternatively, sensitivity can be assessed based on file size (block 212). In some implementations, the bigger a file size, the higher sensitivity and the more suspicious corresponding network activity may be. In some implementations, sensitivity based on file size can be determined on a gradient/scale based on one or more factors, such as file type. For example, a 10 MB PowerPoint may be normal, but a 10 MB Word Document may be more suspicious. The 10 MB Word Document may therefore be more suspicious and thus have higher sensitivity than the 10 MB PowerPoint. Assessing risk based on size can also scale with the file type and/or file size compression software, such as a .zip file, which may obfuscate the volume or size of the files or documents contained within the compressed file.

Additionally or alternatively, sensitivity can be assessed based on sensitivity type of data associated with the file (block 214). In other words, sensitivity can be assessed based on an area of the enterprise from which the data emanates. Human resources (HR) data, proprietary software code, customer data, financial data, and/or other personal data/records may be considered sensitive areas, or at least more sensitive areas than other areas in the enterprise. If data within a file is associated with one of these sensitive areas, then the network activity may be classified as high sensitivity, and thus riskier of a security threat to the enterprise.

Additionally or alternatively, sensitivity can be assessed based on a user associated with the file (block 216). The computer system may determine whether the file type involved in the network activity is within the domain of the user who is sending the file. If, for example, a user is the only one in an associated group (e.g., a team that the user is part of) to send a particular file type, then the sensitivity of the associated network activity may be higher than if all or a portion of users in the associated group send the particular file type.

Moreover, the computer system can determine whether the user has access rights and/or privileges to access, manipulate, use, send, etc. the particular file and/or file type. If, for example, the user is a website developer for the enterprise and attempts sending a 10 MB Word Document with customer information to some recipient, the sensitivity associated with this activity may be high because a website developer is not authorized to access sensitive information such as customer information.

In some implementations, the computer system can also assess a risk level associated with the user to determine sensitivity of the network activity. A user who has a higher risk level (e.g., score) may cause the computer system to determine that network activity associated with that user is of higher sensitivity than another user who has a lower risk level. User risk levels can be assessed and determined based on security event rules that may be triggered by the user's activities over some period of time. The risk levels can also be based on risks that are associated with the user's role in the enterprise. Sensitivity associated with the network activity can be assessed based on any combination of the blocks 208-216.

If the sensitivity of the network activity does not satisfy the threshold level of sensitivity, the computer system can proceed to block 226. In block 226, the computer system can determine whether the network activity triggers a quantity of security event rules that exceeds a threshold amount of security event rules. The more security event rules that are triggered (e.g., satisfied), the more likely the user is attempting to subvert the security wall of the enterprise using one or more different mechanisms. The threshold amount of security event rules can vary based on one or more factors. Example factors can include user role, file type and/or any other factors described in blocks 208-216. As an illustrative example, a user with access rights to confidential information may only have to trigger three security event rules in comparison to a website developer without access to confidential information in order for the threshold amount of security event rules to be met in block 226.

If the quantity of security event rules does not exceed the threshold amount, then the computer system can return to block 202 and continue monitoring for more network activity. In other words, the network activity may not rise to a level of suspicion that suggests more network monitoring should be performed in associated with the network activity. If, on the other hand, the quantity of security event rules does exceed the threshold amount, then the computer system can proceed to block 218, described below.

Referring back to block 206, if the sensitivity of the network activity satisfies the threshold level of sensitivity, then the computer system can proceed to block 218. In other words, the network activity can be associated with a file that is sensitive enough for additional monitoring to occur in relation to the network activity.

In block 218, the computer system can receive network activity information over a period of time from time=1. In block 218, the computer system can start a timer. The timer can run for a period of time, which can be based on the sensitivity associated with the blocked network activity. The timer length can vary based on other factors, such as a risk level associated with the network activity and/or a risk level associated with the user. Therefore, the length of the timer can vary on a file-level rather than an organization (e.g., enterprise)-level. In some implementations, for example, the higher sensitivity of the network activity, the longer the timer can run. This may be the case, for example, because it can take the user more time to attempt different ways to successfully move highly confidential information than a user who is attempting to send a large file with little to no confidential information. In some implementations, the timer can run for six hours. One or more other periods of time can be used, including but not limited to five hours, seven hours, ten hours, twelve hours, etc.

During the period of time in which the timer runs, the computer system can assess whether the user's subsequent network activity triggers one or more additional security event rules and/or is blocked. If the user tries different methods/mechanisms during the time in which the timer runs to achieve what was attempted before the network activity was blocked, then the computer system can determine that the user is subverting the security wall and thus poses a security risk/threat to the enterprise.

Next, the computer system can determine if any network activity during the period of time satisfies criteria for at least one security event rule (block 220). As mentioned above, the computer system can monitor network activity after the blocking (block 205) to determine whether any additional network activity triggers and satisfies security event rules while the timer is running.

As an illustrative example, the user may try to load a file to a thumb drive. The file can be a sensitive document. This activity can be blocked and a timer can start. Within the timer window, the user can try sending the same file to a personal email address. This subsequent activity can trigger a security event rule and thus, in combination with the initially blocked network activity, can indicate that the user likely poses a security threat to the enterprise. The combination of these activities can provide a security analyst, for example, with more context to determine intent of the user to subvert the security wall of the enterprise. This combination of activities can also be used by the security analyst to understand how the user has changed their activity to try and avoid or get over the security wall, which can provide insight into how to improve the security wall and/or prevent future attempts by the user or other users to avoid or get over the security wall.

If the network activity does not satisfy any criteria, then the computer system can return to block 202 and continue to monitor network activity. The computer system can determine, for example, that the network activity that was blocked in block 205 was most likely a mistake of the user and thus not an attempt to subvert the security wall. After all, while the timer was running, the user did not attempt subsequent methods/mechanisms to accomplish what was blocked in block 205.

If the network activity does satisfy criteria for at least one security rule in block 220, then the computer system can perform one or more operations in response to determining the network activity satisfies the criteria (block 222). For example, the computer system can determine that the user likely has the intent to subvert the security wall. The computer system can block this network activity. The computer system can generate an alert associated with the user and/or the blocked network activities. The alert can be transmitted to a user device of a security analyst of the enterprise. Based on the alert, the security analyst can take one or more actions to monitor, prevent, and/or apprehend the user. The computer system can also add the blocked activities to a case file for the user. The case file can be used by the security analyst to develop a better understanding of intent of the user to subvert the security wall. The case file can also be used by the security analyst to determine how to respond to activities of the user.

Optionally, the computer system can also attribute the network activity to a user in the enterprise (block 224). Attributing the network activity to the user can be beneficial for assessing threats that users may pose to the enterprise. As mentioned above, a case file associated with a user can include all instances of the user's network activity that had been blocked over some period of time. A security analyst can review the blocked network activity in the case file (along with additional information such as file sensitivity for the network activity, risk level of the user, etc.) to determine whether the user poses a security threat to the enterprise, whether the user is a repeat offender, and/or whether the user made a mistake or unintentionally triggered one or more security event rules.

The network activity can be attributed to the user in a variety of ways. Using persistent monitoring of network activity, the computer system can stitch together various separately blocked activities to determine how they relate to each other and who in the enterprise is associated with the activities. This can provide a more comprehensive understanding of potential and actual security threats as well as what types of actions can be taken to prevent and/or respond to attempts to subvert the security wall of the enterprise.

Attribution can be achieved using hash values associated with the network activity. A hash is a fingerprint of a file. The hash can be used to identify transmission of the exact file within or leaving an environment associated with the file. By leveraging metadata of the file, such as the hash, the disclosed techniques can be used to combine a myriad of attributes to generate a unique indicator for the file. The unique indicator for the file can then be used to attribute the file (and related network activity) to a particular user. The myriad of attributes can include, but is not limited to, when the file was created, file size, file type, and/or author.

Accordingly, in some implementations, a combination of a file name, file type, and/or file size can be used to attribute network activity to the user. In some implementations, attribution can be accomplished using assessment of a header of the file associated with the network activity. For example, the computer system can assess a date created, a last modified date, an amount of time that the file was opened, when the file was opened, whether the file involves sensitive information, and whether the file includes a unique combination of strings or other text. If the user opens the file for a short period of time (e.g., five minutes) but then creates another file subsequent to the network activity involving opening the file being blocked, then these activities can be attributed to the same user. After all, the computer system can make an assumption that the file that was open for only five minutes may have been copied and put into another file that was created by the same user after the block. If the user tries sending a PowerPoint and is blocked from doing so, then the user sends a Word Document having similar or same strings as that in the PowerPoint, the two activities can be attributed to the same user. The computer system can make an assumption that these two activities are associated with each other and thus the same user who is attempting to transfer information from the PowerPoint in a Word Document to send to another user (e.g., an unauthorized recipient).

FIG. 3 is another flowchart of a process 300 for identifying attempts to subvert a security wall in an enterprise. The process 300 can be performed by the network security system 102. The process 300 can also be performed by one or more other computing systems, devices, computers, networks, cloud-based systems, and/or cloud-based services. For illustrative purposes, the process 300 is described from the perspective of a computer system.

Referring to the process 300 in FIG. 3, the computer system can block network activity in block 302. Refer to blocks 202-205 in the process 200 of FIG. 2 for additional discussion about blocking network activity.

In block 304, the computer system can begin monitoring subsequent network activity. As described in reference to block 218 in the process 200 of FIG. 2, the computer system can start a timer. During the timer window, the computer system can monitor network activity and continuously evaluate one or more security event rules against the network activity to determine whether any of the security event rules are satisfied. After a user's network activity is blocked once (block 302), the computer system can continuously monitor network activity of the user with security event rules that can be evaluated in parallel. The rules can be evaluated in parallel to determine which techniques, methods, and/or mechanisms may be used by the user to subvert the security wall after first being blocked in block 302.

For example, the computer system can evaluate a virtual machine (VM) security rule (block 306). The VM security rule can be evaluated to determine whether the user is trying to avoid the security wall. The user may try to perform some activity on a corporate device (such as accessing an internal network of the enterprise), which is blocked (block 302). In response, the user may open another software on the corporate device that spins up a VM, which can subvert at least a portion of endpoint controls that may be on the corporate device. The VM is able to subvert at least a portion of the endpoint controls because the VM makes it look as if activity is coming from a different device/machine, not the corporate device. After all, the VM can obfuscate an ID associated with the corporate device, such as an IP address.

Since the endpoint control of the computer system may not have visibility into a VM, the computer system may rely on network transmissions within the timer window and other controls to determine whether the user is trying to subvert the wall by accessing the internal network via the VM. As another control, the computer system can assess how many hops it takes for the user to get to the internal network. The number of hops it takes can be part of network activity information that is monitored by the computer system. For example, when the computer system monitors network activity, it can receive an indication of network activity from the VM. The network activity can be received by the computer system as a network packet, which can include various information, such as a number of hops. In some implementations, the computer system may also poll the corporate device for hop information.

The VM security rule can indicate that anything more than one hop may be indicative of an attempt to subvert the security wall. A hop refers to a number of routers that a network packet passes through from its source to its destination. Thus, if the information in the network packet indicates two hops, the computer system can determine this is likely suspicious activity. The VM security rule is satisfied. After all, the user went through the corporate device and the VM (two routers) in order to access the internal network and avoid/subvert the security wall of the enterprise. Assessment of hop information can also be used to determine whether the user uses any other type of proxy to subvert the security wall. Moreover, the VM security rule can be triggered (e.g., satisfied) in scenarios where the user downloads or otherwise uses certain tools to make a proxy or control in place at the corporate device (or other device of the user) look like the activity originates from something other than the corporate device.

The computer system can also evaluate a proxy security rule (block 308). The proxy security rule can be triggered (e.g., satisfied) if the user attempts to break the security wall. For example, the user may attempt to end or kill a process in which an endpoint control runs to then perform activity that was blocked in block 302. The user may download software that makes it look as if controls are coming from another device. The user may use the software to get admin rights and thus make it look as if the user can overwrite the endpoint control (e.g., security control). This activity can trigger the proxy security rule.

As another example, the proxy security rule can be satisfied if the user attempts to send files/data via a proxy because the user may be blocked from downloading the files/data to their device and/or may be blocked from sending the files/data via their work email. The proxy can be, for example, a file sharing system, a personal email service, malware, less common network protocols, and/or a local/personal network-attached storage (NAS). One or more other proxies may also be used and may trigger the proxy security rule in block 308.

As an illustrative example, the user may be working at home on a corporate device. They can be blocked from downloading a corporate file onto a USB drive (block 302). Next, the user may try uploading the corporate file to a local NAS and/or sending the corporate file via a personal email account. If these activities occur within the timer window, the computer system can determine that the proxy security rule is satisfied. The computer system can identify avoidance or breaking of the security wall based on identifying what proxies the user jumps to during the timer window and after the first blocking of network activity in block 302.

The computer system can also evaluate a local data storage device security rule (block 310). The local data storage device security rule can be satisfied if the user attempts to avoid the security wall. This rule can be triggered when the user attempts to download files to and/or from a device including but not limited to a thumb drive, a USB drive, a hard drive, a cloud-based storage system, or another type of storage device that is not part of the user's user device (e.g., corporate device).

As an illustrative example, the user can attempt downloading an unauthorized file directly to their corporate device. This activity can be blocked (block 302) and a timer can begin (block 304). While the timer is running, the user may attempt getting around the block/security wall by downloading the same unauthorized file to another device, such as a USB drive. This activity can satisfy the local data storage device security rule and thus be indicative of suspicious activity on part of the user.

The computer system can also evaluate an email security rule (block 312). The email security rule can be satisfied if the user attempts to avoid the security wall. This rule can be triggered if the user attempts to send files (or particular files) via a personal email. This rule may also be triggered if the user attempts to send files to unknown email addresses, such as email addresses that are not enterprise email addresses or email addresses that are infrequently or not recipients of emails from other users in the enterprise.

As an illustrative example, the user may attempt loading a file with confidential information onto a USB drive. This activity may be blocked in block 302 and the timer can begin in block 304. The user may then try sending the file via their personal email address within the timer window. This activity can trigger the email security rule since the user is trying to avoid the security wall.

As another illustrative example, the user may try sending a file via their email (e.g., a work email and/or a private email) to an unauthorized recipient. This activity can be blocked because, for example, the user may not be permitted to upload a file having a size that is greater than some threshold file size. The user can then send the file via their email to someone else in the enterprise and ask that other person to upload or send the file to the unauthorized recipient. The user can also just ask the other person to send the file on their behalf. The other person may be unassociated with the user and/or the file. The other person also may not have restrictions on what file size they can send via email. The other person may upload the file or perform any activity they desire to send out the file to the unauthorized recipient. For example, the user can work on a PowerPoint slide deck with confidential information but may not have privileges to send the slide deck via their email. Therefore, they can ask a former employee of the enterprise to send the slide deck on their behalf to an unauthorized recipient. Although this activity comes from someone other than the user, the activity by the other person can trigger the email security rule since the user is avoiding the security wall during the timer window.

The computer system can draw lines/associations between users. If, for example, there is a connection between one or more users who perform network activity within the timer window, the computer system may determine that the email security rule is satisfied. The computer system can use a variety of information, such as whether the user and the other person sit next to each other in an office space, whether they have a same job title and/or manager, etc., to make associations between the network activity of the user and the network activity of the other person. The email security rule can be used to determine when network activity may compromise protection of the enterprise's data. Therefore, it can be advantageous to determine what data is attempting to be shared rather than who is attempting to share that data. The variety of information mentioned above can therefore be used to determine whether the user and the other person are working together to compromise the enterprise's data.

In some implementations, as described throughout this disclosure, the computer system may associate both activities with the same user, even though they were performed by different users. Refer to block 224 in the process 200 of FIG. 2 for additional discussion about associating the activities with the user.

The computer system can also evaluate one or more other security rules (block 314). The other security rules can be created and determined based on the enterprise's environment. The other security rules may be dynamically generated based on the monitoring of network activity over time. Therefore, the enterprise may implement one or more other security rules that cater specifically to types of network activity that is commonly monitored in the enterprise environment (e.g., network activity that is commonly performed by users who attempt to subvert the security wall of the enterprise). As a result, the techniques described herein can be adaptable and dynamic to each enterprise's individual needs. The other security rules can, for example, be satisfied based on one or more different thresholds that are set for file types, file sizes, content in the file, sensitivity type of data associated with the file, and/or a user associated with the file (e.g., refer to blocks 208-216 in the process 200 of FIG. 2).

Once the network activity is evaluated against the security rules, the computer system can associate the network activity in block 316. Associations can be made based on what values or information are accessible in logs of network events. Such values and/or information can include, but are not limited to, user identifiers, computer names, computer identifiers, IP addresses, IP addresses combined with timestamps, email addresses, and/or application identifiers. Additionally, various data sources can be joined together to make associations and link users with the network activity across a network and/or endpoint actions and using the values or information available from the logs.

The computer system can make associations between any network activity that triggers (e.g., satisfies) one or more security event rules and the original network activity that was blocked in block 302. Associations can also be made based on data elements in the network activity information, such as timing of the activity (e.g., within the timer window). Associations between network activity can also be made as described in reference to block 312 above. The computer system can also make associations with the blocked network activity and a user in the enterprise, as described in reference to the block 224 in the process 200 of FIG. 2.

The computer system can then determine whether the associated activity is an attempt to thwart a security system of the enterprise (block 318). In other words, the computer system can determine whether the collective of network activity that was blocked and/or triggered security event rules is an attempt to subvert the security wall of the enterprise by the user. The computer system can determine, for example, that the user associated with the network activity likely made an unintentional error that triggered one or more rules. Therefore, the user likely does not have intent to subvert the security wall. The computer system can also determine that the user intentionally subverted the security wall based on multiple different attempts (during the timer window) to achieve what the user was initially trying to achieve when their activity was initially blocked in block 302.

Based on the determination in block 318, the computer system can optionally perform one or more actions/operations. For example, the computer system can optionally generate an alert (block 320). The computer system may optionally block the network activity (block 322). The computer system may perform any other operations described throughout this disclosure, for example as described in reference to block 222 in the process 200 of FIG. 2.

Figure 4:
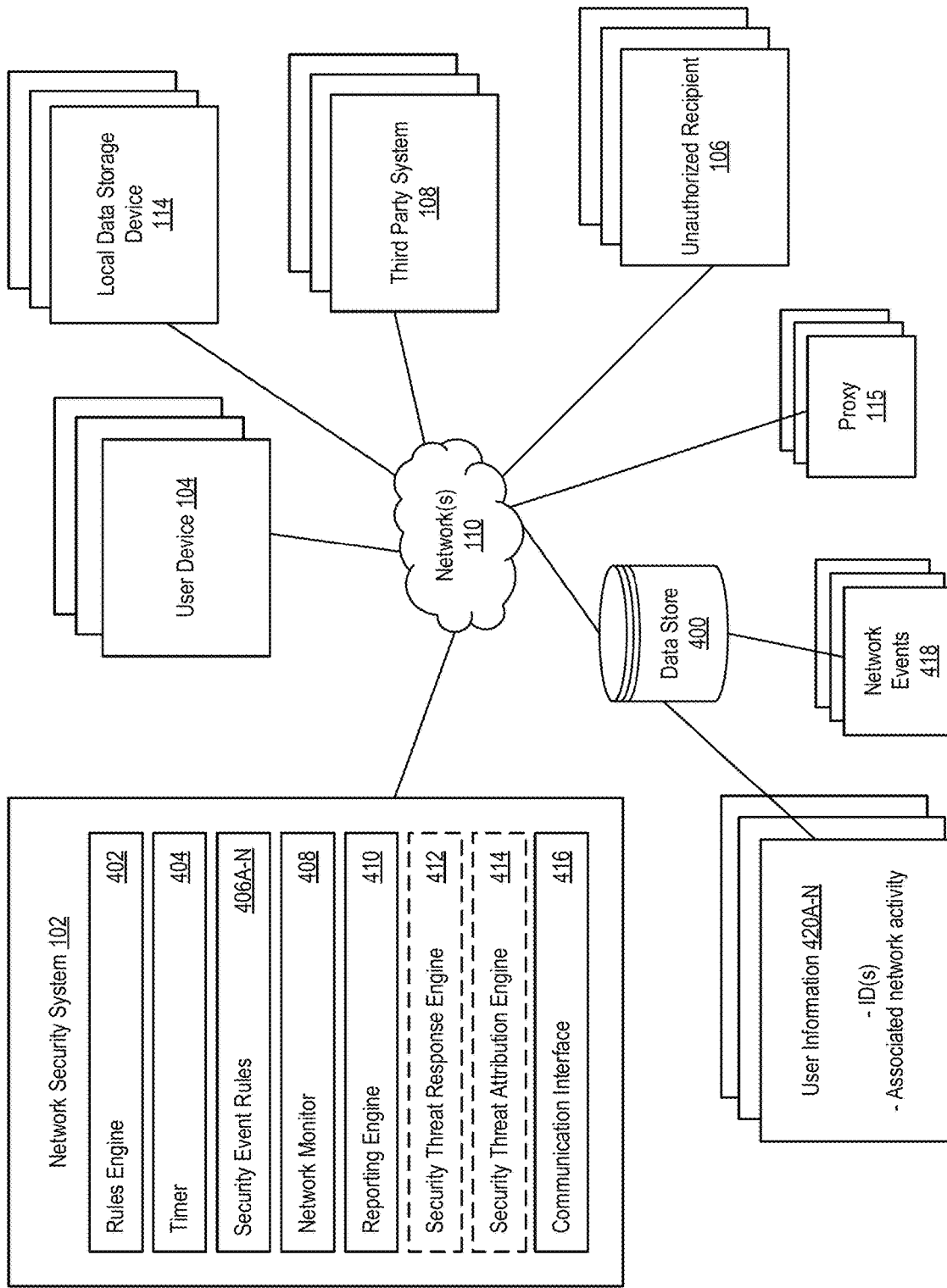
FIG. 4 is a system diagram depicting one or more components that can perform the techniques described herein.

FIG. 4 is a system diagram depicting one or more components that can perform the techniques described herein. The network security system 102, user device 104, unauthorized recipient 106, third party system 108, local data storage device 114, proxy 115, and data store 400 communicate (e.g., wired and/or wireless) via the network(s) 110.

In brief, the network security system 102 can be deployed by an enterprise to monitor network activity, identify potential threats to the enterprise, and/or response to such threats.

The user device 104 can be used by a relevant user in the enterprise, such as an employee. The user device 104 can be any type of computing device, including but not limited to a computer, laptop, tablet, cellphone, mobile phone, and/or smartphone. The user device 104 can be a personal device, which can be owned by the relevant user and used by the user for performing functions, such as their job, for the enterprise. The user device 104 can then connect to one or more other devices, such as enterprise devices via a closed network or enterprise network (e.g., the network 110). The user device 104 can also be a corporate device that is owned by the enterprise and used/borrowed by the relevant user to perform their functions for the enterprise. As described herein, the relevant users can use their user devices 104 to perform their job role functions and responsibilities and/or to engage in activities that are personal or otherwise not aligned with the users' job role. Moreover, as described herein, one or more security checks associated with the network security system 102 for the enterprise can be installed on, or accessing, the user device 104 to monitor network activity thereto and therefrom.

The unauthorized recipient 106 can be any computing device of a user who is not associated with the enterprise. The unauthorized recipient 106 can also be the computing device of a user who is associated with the enterprise but has malicious intent as recipient of whatever information it is receiving. For example, the unauthorized recipient 106 can be a user device associated with an employee of the enterprise. The employee can be intending to receive a file with confidential information from another employee in the enterprise. The employee may not have access rights to the confidential information. The employee may desire to expose the confidential information once it is received from the other employee who has access right to the information. Thus, the employee (and their respective device) can be the unauthorized recipient 106.

The third party system 108 can be any computing system, cloud-based system, and/or network of devices/systems that is not an intended recipient of information from within the enterprise. The third party system 108 can also be any other unauthorized actor that can be used by a user of the enterprise to subvert the security wall. For example, the third party system 108 can be a file sharing system external of the enterprise. The third party system 108 can be different from the unauthorized recipient 106. In some implementations, the third party system 108 can be the same as the unauthorized recipient 106. Moreover, in some implementations, the third party system 108 can be the same or different than the proxy 115.

The local data storage device 114 can be any type of device, system, and/or network of devices that may not be part of the user device 104 or other devices in the enterprise. The local data storage device 114, for example, can be a USB drive, thumb drive, hard drive, or other type of device for maintaining copies of files and information external from a computing system. The local data storage device 114 can be separate from the user device 104 but may, for example, connect or plug in to the user device 104.

The proxy 115 can be a service, such as a cloud-based service, software, and/or application that can be downloaded onto or otherwise accessed by the user device 104. The proxy 115 can also be a server, computing system, or other hardware. The proxy 115 can serve as an intermediary between the user device 104 and one or more other components described herein. The proxy 115 can translate network traffic between devices, systems, and/or servers in the network(s) 110. The proxy 155, as described herein, may also obfuscate or otherwise hide/mask/filter activity originating from the user device 104, such as a virtual machine, as the user device 104 attempts to thwart the security of the enterprise. Therefore, the user at the user device 104 can use the proxy 115 to attempt subverting the security wall.

The data store 400 can be any type of data store, database, and/or cloud-based storage that can store information for the enterprise. For example, the data store 400 can store user information 420A-N. The user information 420A-N can be associated with users of the enterprise, such as employees. The user information 420A-N can include information including but not limited to user identifiers (IDs), such as employee account/login information, IP addresses, and other unique identifiers for identifying the employee and/or the user devices 104 associated with the employee. The user information 420A-N can also store information such as associated network activity. A record or case file of network activity that is attributed to the employee can be stored in the user information 420A-N and used by security personnel in the enterprise to monitor the employee and perform one or more actions in response to malicious activity of the employee (e.g., apprehend the employee, block the employee from performing certain activities, remove privileges/access rights of the employee, etc.).

The data store 400 may also maintain network events 418. The network events 418 can be extracted and processed from network activity, as described in FIGS. 5A-B. The network events 418 can be retrieved by the network security system 102 and assessed against security event rules 406A-N to determine whether a collective of network events 418 is representative of an attempt to thwart the security of the enterprise. The network events 418 can also be associated with one or more relevant users in the enterprise by the network security system 102. Such associations can be stored in the corresponding user information 420A-N as the associated network activity.

Referring back to the network security system 102, the system 102 can include a rules engine 402, timer 404, security event rules 406A-N, network monitor 408, reporting engine 410, security threat response engine 412, security threat attribution engine 414, and a communication interface 416. The rules engine 402 can be configured to generate security event rules 406A-N for the enterprise. As described throughout this disclosure, the security event rules 406A-N can be generated specific to the network activity (e.g., network events 418) that is monitored for the particular enterprise. As a result, the security event rules 406A-N can be dynamically adapted to the needs of the particular enterprise and may be designed to trigger on suspicious activities that are common for the enterprise. The rules engine 402 may also be configured to raise and/or lower sensitivity threshold levels for one or more of the security event rules 406A-N based on monitored activity in the enterprise. The rules engine 402 may also modify any of the security event rules 406A-N based on the monitored activity in the enterprise.

The timer 404 can be configured to begin a timer window when (i) network activity is blocked by one or more security event rules 406A-N, (ii) the network activity has a sensitivity level that exceeds some threshold range, and/or (iii) the network activity satisfied a quantity of the security event rules 406A-N that exceeds some threshold quantity. The timer 404 may also determine a length of the timer window based on at least one of (i)-(iii). As described herein, after network activity has been blocked, the timer 404 can be used to keep track of any subsequent network activity that may be stitched together with the blocked activity to determine a security threat to the enterprise.

The security event rules 406A-N can be continuously evaluated against network activity (e.g., the network events 418) that is monitored by the network monitor 408. Each of the security event rules 406A-N can be triggered based on different types of network activity, sensitivity levels, and/or information about files and/or users that are associated with the monitored network activity. As described in FIG. 3, for example, the security event rules 406A-N can include a VM security rule, a proxy security rule, a local data storage device security rule, an email security rule, and any other type of security rule that may be generated by the rules engine 402.

The network monitor 408 can be configured to continuously monitor network activity, as described throughout this disclosure. The network monitor 408 may also perform the techniques described further below in FIGS. 5A-B, which can be used to generate the network events 418 from the network activity. The security event rules 406A-N may then be evaluated against the network events 418. The network monitor 408 may also locally monitor network activity via one or more security checks that can be deployed at/installed on the user devices 104 (e.g., refer to FIG. 1).

The network monitor 408 can block network activity. For example, the network monitor 408 can receive an indication from one or more of the security event rules 406A-N that the network activity (e.g., the network event 418) satisfied/triggered the respective rule(s) 406A-N. The network monitor 408 may also determine a sensitivity level associated with the network activity, whether the sensitivity level satisfies a threshold sensitivity level, and how many rules 406A-N were satisfied. Based on this combination of information, the network monitor 408 can (i) block the network activity, (ii) send a notification to the timer 404 to begin the timer window, and/or (iii) make a determination that the network activity is suspicious and a user associated with the network activity is attempting to subvert the security wall of the enterprise. Refer to FIG. 2 for additional discussion. The network monitor 408 may also associate separate network activity to determine whether that associated activity is an attempt to subvert the security wall. Refer to blocks 316-318 in the process 300 of FIG. 3 for additional discussion.

The reporting engine 410 can be configured to generate alerts when one or more security event rules 406A-N are satisfied, when network activity is blocked, and/or when the network monitor 408 determines that the user associated with the network activity is attempting to subvert the security wall. As described throughout this disclosure, the alerts can be transmitted to a computing device of a security analyst or other relevant user in the enterprise. The alerts can be used to assess security threats to the enterprise and to plan how to respond to the threats and/or prevent future threats.

The security threat response engine 412 is optional and can be configured to perform one or more actions in response to the network monitor 408 identifying a security threat. Sometimes, the engine 412 can block the network activity. Sometimes, the engine 412 can transmit the alert generated by the reporting engine 410 to computing devices of security analysts. The engine 412 may also add the blocked network activity to a case file that is associated with a particular user in the enterprise. The engine 412 can also perform any of the operations described above in FIGS. 1-3.

The security threat attribution engine 414 is optional and can be configured to associate network activity with users in the enterprise, as described in reference to block 224 in the process 200 of FIG. 2. The associated network activity can be stored in the user information 420A-N. In some implementations, the associated network activity can be stored as a case file for the particular user. The engine 414 can stitch together separate network activities that triggered one or more security event rules 406A-N, as described in the block 316 in the process 300 of FIG. 3.

The communication interface 416 can be configured to provide communication between one or more of the components described herein.

FIGS. 5A-B are block diagrams of an example system for generating events in response to network activity. The example system depicted in FIGS. 5A-B can be the network security system 102 described herein. In some implementations, the techniques described in reference to FIGS. 5A-B can be performed by another computing system.

Referring to FIG. 5A, a network 502 is being protected by one or more security analysts. The security analysts are users that are tasked with monitoring the security state of the network 502 and to prevent malicious activity like malware execution, data exfiltration, etc.

The network 502 is, for example, a local network, intranet, virtual private network, or other data network used by an enterprise. The network 502 can include networking hardware such as cables, wireless access points, routers, gateways, firewalls, etc., that work together to allow resident machines 504 to communicate with other resident machines 504 and with computing resources outside of the network 502. The resident machines 504 can include, but are not limited to, personal computers, servers, and mobile devices, such as the user device 104 described throughout this disclosure.

Operations of the network 502 and resident machines 504 may come under attack from malicious actors—users and/or automated services that seek to exploit computing resources they do not own or have authorization to use. The network security system 102 can be configured to provide monitoring functionality that generates data based on the activity on the network—including malicious activity, as described above. This monitoring can then be provided to a security analyst that is tasked with stopping or attempting to stop these attacks through various types of security responses.

When the resident machines 504 participate in data transmission on the network 502, an array of network security sensors 506 can sense the network activity and generate data for one or more events that represent the activity. For example, the sensors 506 can be connected to the physical layer of the network (e.g., wires, wireless data transmissions) and be configured to respond when signals indicate that network activity is happening. The sensors can respond to this sensing by creating data even when the sensed activity is not addressed to or involve the sensors 506.

Depending on the size and scale of the network 502, one array of network sensors 506 may have more or fewer sensors than another array of network sensors. In various examples, hundreds, thousands, tens of thousands, or hundreds of thousands of sensors can be used, although more or fewer are possible. In addition or in the alternative, the sensors 506 can also record non-network activity. For example, when devices hosted on the network perform sensitive operations (e.g., accessing a sensitive data repository, executing applications, etc.), the sensors 506 can sense these activities.

The sensors 506 can provide the initial event data 508 to one or more initial event queues 510. The initial event data 508 may include data objects that do not conform to any single format or structure, may be out of chronological order, and may otherwise be non-homogeneous. The initial event queues 510 can receive the initial event data 508 and deserialize the data objects of the initial event data 508 into deserialized event data 512. The deserialized event data 512 can include all or part of the data included in the initial event data 508, and has been deserialized. In general, serialization of data involves the transforming or reconfiguring of data so that it can be stored, transmitted, etc. For example, the serialization process performed by the initial event queues 510 can include padding out short data strings or removing redundant data, decompressing compressed data, changing the format, etc.

One or more normalizer/decorator pipelines 514 can receive the deserialized event data 512 from the initial event queues 510 and process the deserialized event data 512 into normalized/decorated event data 516. For example, the normalizer/decorator pipelines 514 can normalize the deserialized event data 512 by editing its structure so that the structure complies with one or more standards, and the normalizer/decorator pipelines 514 can decorate the deserialized event data 512 by adding data to the events from other sources (e.g., timestamps, geo-location data, threat intelligence data, a connection-identifier.)

The number of normalizer/decorator pipelines 514 can change depending on the load of the initial event queues 510. For example, new instances of normalizer/decorator pipelines 514 can be generated and used when a backlog of deserialized event data 512 is prepared by the initial event queue 510, and these normalizer/decorator pipelines 514 can be released and idle when the backlog falls under a threshold size, is empty, begins trending downward, etc.

In some cases, the ramp-up of the normalizer/decorator pipelines 514 can be more sensitive than the ramp-down. That is, a particular growth in backlog may cause more normalizer/decorator pipelines 514 to be instantiated faster than a similar reduction in backlog. This may be accomplished, for example, by adding N normalizer/decorator pipelines 514 every time-unit (e.g., second, 30 seconds, minute, hour) a backlog over a certain size is seen, and removing only M normalizer/decorator pipelines 514 every time-unit the backlog over a certain size is not seen, where N is greater than M (e.g., N=2; M=1; e.g., N=4; M=1.) In addition to backlog size, other parameters are possible including, but not limited to, rate of change of backlog, priority of traffic resident in the backlog, price of allocation of resources, etc.

The network security system 102 can be configured to use the normalizer/decorator pipelines 514 to efficiently make matches and append flags to data. One such type of flag is an Indicator of Compromise (IoC) that records information a compromise. IoC can generally include single pieces of information that can be quickly examined and flagged. By using simple, single data matching, fewer computational resources may be required compared to more complex matching. By appending the IoC with the normalizer/decorator pipelines 514, later elements such as a security frontend 524 may be executed with less resources than would otherwise be needed. For example, the normalizer/decorator pipelines 514 can be configured to match in-network activity to lists of known malicious indicators. This includes hashes (MD5, SHA1 SHA256) of a known-malicious file (e.g. a document with a script containing malicious activity) or an IP address of an endpoint in a network communication. This configuration can tie IoCs to related data early in the process, removing a need to keep tables mapping network activity to IoCs for use later in the pipeline. Other types of matching include, but are not limited to, matching subdomains to top-level domains, use of regular expressions, etc.

An aggregator data store 522 can collect structured event data 520 and store the structured event data 520 in an indexable and searchable data store 522. The aggregator data store 522 may store all of the structured event data 520 until the aggregator data store 522 is full or otherwise storing at least a threshold amount of data or data older than a threshold period of time. When this volume or age of data is reached, the oldest data may be discarded, making room for new data. That is, the aggregator data store 522 may operate as a rolling buffer that provides storage for the new data, discarding the old data. Other storage systems (not shown here for clarity) can be used for long-term or archival storage, which may provide less expensive storage that is slower to respond to queries.

The security frontend 524 can provide a graphical user interface (GUI) to a computer and/or other devices used by a security analyst 526. The GUI can provide the security analyst 526 with access to the structured event data 520 that is stored in the aggregator data store 522 in a way that allows the security analyst 526 to understand and more quickly investigate security events of the network 502 that may or may not be malicious. For example, the GUI can provide the security analyst 526 with tools to draft queries, test the queries on the structured event data 520, and then store the same query for use as a rule on future events that are collected from the network 502.

In addition, the security frontend 524 can execute one or more rules on the incoming structured event data 520. These rules may contain conditional statements that, if ever found true on incoming event data, trigger response statements. These response statements can include instructions for automated responses (e.g., quarantining a device on the network 502, subjecting a data connection to enhanced analysis) as well as alerts to communicate the fact that a rule was triggered. These alerts may be transmitted to users via one or more channels that include email, text message, and the generation of a ticket in a ticketing system.

The use of the structure of the network security system 102 allows for efficient generation of alerts and processing of network events. For example, as shown here, both normalization and decoration of event data with IoCs can be performed as part of the ingestion of the network data instead of later once event data objects are created and ingested into storage. By using this type of architecture and performing decoration at the time of ingestion, the computing resources needed for decoration can be reduced. As done here, decoration with IoCs can be as simple as maintaining a dictionary of key:value pairs for various fields, and as the normalizer/decorator pipelines 514 normalizes the event data, the event data value can be run through the dictionary.

Any hits in the dictionary, where a field of the event data object matches a key entry, can result in the copying of the key:value pair to the event data object. As will be understood, this can be implemented in a very efficient and thus fast-to-process format that scales slowly as the number of events grows and as the size of the dictionary grows. By way of comparison, decorating events after they already are stored in a datastore can involve far more complex Boolean operations, repetitive traversals, etc. that have the result of becoming less performant as the number of events or size of the dictionary grows.

In this way, extensive and fine-grain event generation, storage, and analysis can be created with the network security system 102. In one example, an enterprise data network that connects hundreds of physical locations and millions of devices can be effectively and efficiently monitored. In this example, tens of thousands sensors 506 can produce tens of trillions of events a day (including hundreds of thousands or millions of events a second). The event-based monitoring system 404 can be created using hardware resources that may be well within an enterprise of this size and scope, and provide access to events in the aggregator datastore 522 within seconds of the event occurring on the network. Further, the rules may be run on the events every minute or every handful of minutes.

Further, the use of a rolling buffer in the aggregator datastore 522 can ensure that the most relevant events—the newest ones—are always available for analysis. In the above example, a week's worth of events can be stored in the rolling buffer. Some indexing can be built on the entire week's worth of data, with enhanced indexing being built on the newest data. In this way, rules to identify potentially malicious activity can be run on the newest data at high speed and efficiency, without requiring re-indexing of all data.

FIG. 5B is a block diagram of optional elements of the network security system 102. As shown here, the normalized event queue 518 can include one or more normalized queues from which network event data can be provided to IoC engines 530 for processing against IoC rules. The IoC engines 530 can receive network event data, either structured or unstructured, along with other pertinent data to the event data, such as additional information added to the network event data in the normalizer/decorator pipelines 514. The IoC engines 530 can access one or more IoC rules from the IoC rules datastore 532 and compare the normalized event data 516 against these rules. If a normalized event data 516 matches an IoC rule, the event data can be decorated with information about the IoC rule, such as a flag or code associated with the matching rule being added to the event data that indicates the implications of the match (e.g., domain for network event is known bad/malicious domain, etc.). These decorated events can be provided to the aggregator datastore 522 for processing against the more computationally intensive rules.

The rules in the IoC rules datastore 532 can include one or more rules that are easy to process (e.g., require few computational resources to run) relative to the rules run against the aggregator datastore 522. Bifurcating processing of the more computationally simple IoC rules from the more complex rules run against the aggregator datastore 522 across different systems can create greater processing efficiency and use of processing resources. The IoC rules can include, for instance, simple pattern or string matching tests. For example, one test may be to compare an MD5 hash of an email attachment against a corpus of MD5 hashes from known-malicious historical email attachments. Since MD5 hashes are not truly unique and hash-collisions of different files are possible, this processing can provide a likely indicator of potentially malicious email traffic. However, because comparing MD5 hashes are computationally simple, this test can be performed quickly and can provide an efficient determination of potentially malicious events.

In some implementations, the IoC rules datastore 532 can include a dynamic rules engine to perform comparison based on the rules stored in the IoC rules datastore 532. When the rules change, the IoC rules datastore 532 can detect the change and initiate an engine rebuild to create a second rules engine using the updated rules. While the rebuild is being performed, traffic can continue to be routed to the first, older, rules engine. Then, when the rebuild is completed, the IoC rules datastore 532 can route new traffic to the second rules engine. Once all the traffic routed to the first rules engine is acted upon, the IoC rules datastore 532 can decommission the old rules engine.

The IoC engine deposits the structured event data 520 into an IoC alert queue 534. The IoC alert queue 534 can collect the received structured event data 520 for storage in the aggregator datastore 522. As described in reference to FIG. 5A, the structured event data 520 can then be outputted in GUIs at user devices of the security analysts.

Figure 6:
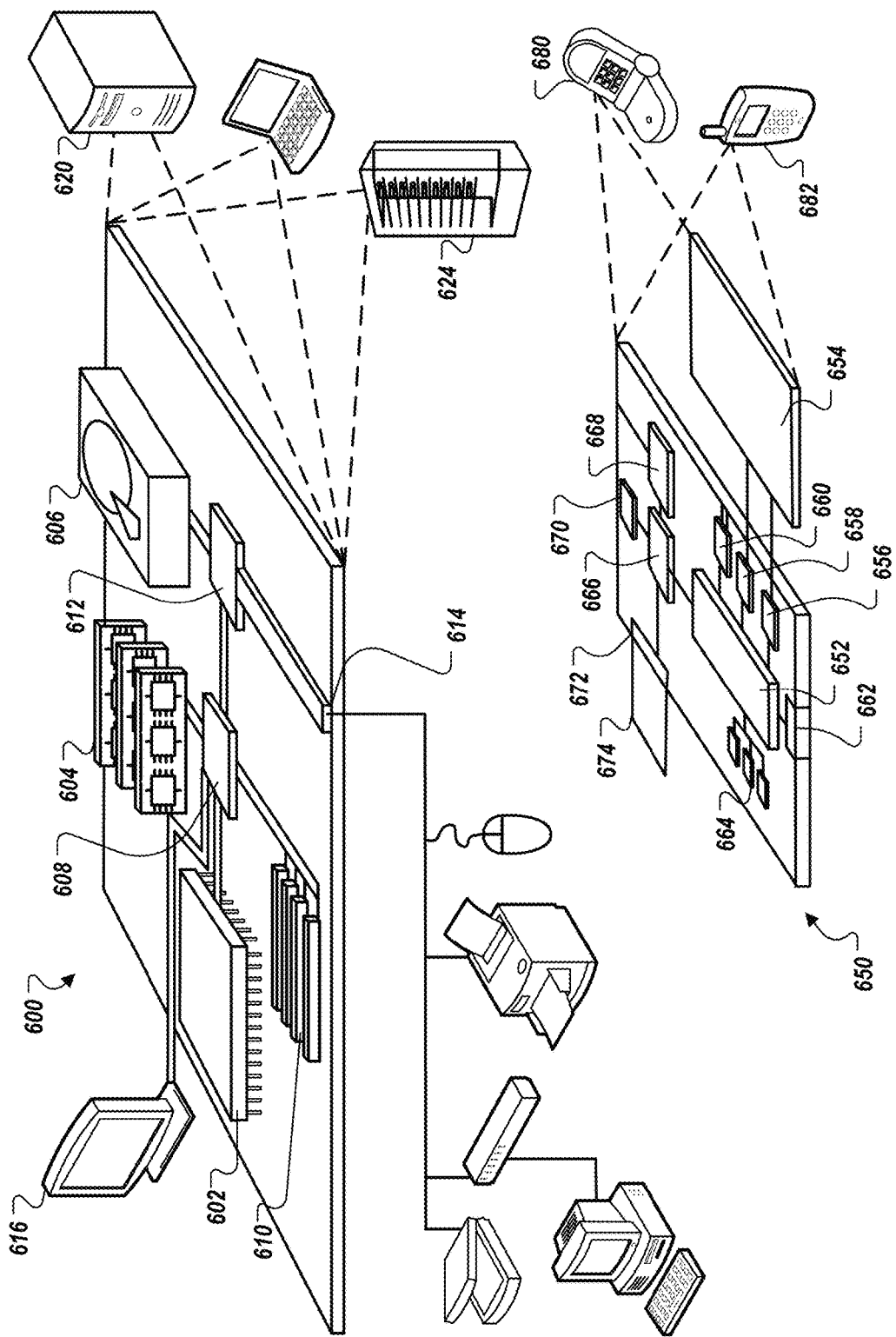
FIG. 6 is a schematic diagram that shows an example of a computing device and a mobile computing device.

FIG. 6 shows an example of a computing device 600 and an example of a mobile computing device that can be used to implement the techniques described here. The computing device 600 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the computing device 600. In some implementations, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 manages bandwidth-intensive operations for the computing device 600, while the low-speed interface 612 manages lower bandwidth-intensive operations. Such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In the implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a standard server 620, or multiple times in a group of such servers. In addition, it can be implemented in a personal computer such as a laptop computer 622. It can also be implemented as part of a rack server system 624. Alternatively, components from the computing device 600 can be combined with other components in a mobile device (not shown), such as a mobile computing device 650. Each of such devices can contain one or more of the computing device 600 and the mobile computing device 650, and an entire system can be made up of multiple computing devices communicating with each other.

The mobile computing device 650 includes a processor 652, a memory 664, an input/output device such as a display 654, a communication interface 666, and a transceiver 668, among other components. The mobile computing device 650 can also be provided with a storage device, such as a micro-drive or other device, to provide additional storage. Each of the processor 652, the memory 664, the display 654, the communication interface 666, and the transceiver 668, are interconnected using various buses, and several of the components can be mounted on a common motherboard or in other manners as appropriate.

The processor 652 can execute instructions within the mobile computing device 650, including instructions stored in the memory 664. The processor 652 can be implemented as a chipset of chips that include separate and multiple analog and digital processors. The processor 652 can provide, for example, for coordination of the other components of the mobile computing device 650, such as control of user interfaces, applications run by the mobile computing device 650, and wireless communication by the mobile computing device 650.

The processor 652 can communicate with a user through a control interface 658 and a display interface 656 coupled to the display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can provide communication with the processor 652, so as to enable near area communication of the mobile computing device 650 with other devices. The external interface 662 can provide, for example, for wired communication in some implementations, or for wireless communication in other implementations, and multiple interfaces can also be used.

The memory 664 stores information within the mobile computing device 650. The memory 664 can be implemented as one or more of a computer-readable medium or media, a volatile memory unit or units, or a non-volatile memory unit or units. An expansion memory 674 can also be provided and connected to the mobile computing device 650 through an expansion interface 672, which can include, for example, a SIMM (Single In Line Memory Module) card interface. The expansion memory 674 can provide extra storage space for the mobile computing device 650, or can also store applications or other information for the mobile computing device 650. Specifically, the expansion memory 674 can include instructions to carry out or supplement the processes described above, and can include secure information also. Thus, for example, the expansion memory 674 can be provide as a security module for the mobile computing device 650, and can be programmed with instructions that permit secure use of the mobile computing device 650. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 664, the expansion memory 674, or memory on the processor 652. In some implementations, the computer program product can be received in a propagated signal, for example, over the transceiver 668 or the external interface 662.

The mobile computing device 650 can communicate wirelessly through the communication interface 666, which can include digital signal processing circuitry where necessary. The communication interface 666 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 668 using a radio-frequency. In addition, short-range communication can occur, such as using a Bluetooth, WiFi, or other such transceiver (not shown). In addition, a GPS (Global Positioning System) receiver module 670 can provide additional navigation- and location-related wireless data to the mobile computing device 650, which can be used as appropriate by applications running on the mobile computing device 650.

The mobile computing device 650 can also communicate audibly using an audio codec 660, which can receive spoken information from a user and convert it to usable digital information. The audio codec 660 can likewise generate audible sound for a user, such as through a speaker, e.g., in a handset of the mobile computing device 650. Such sound can include sound from voice telephone calls, can include recorded sound (e.g., voice messages, music files, etc.) and can also include sound generated by applications operating on the mobile computing device 650.

The mobile computing device 650 can be implemented in a number of different forms, as shown in the figure. For example, it can be implemented as a cellular telephone 680. It can also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for monitoring and identifying attempts to subvert a security wall within a network infrastructure, the method comprising:
    receiving, by a network security system monitoring and protecting the network infrastructure, network activity data for a first network activity for the network infrastructure that includes information identifying a user device from which the first network activity originates;
    deserializing the network activity data of the first network activity;
    appending flags corresponding to indicators of compromise to the deserialized network activity data;
    determining, by the network security system and based on the flags that are appended to the deserialized network activity data, whether the first network activity triggers at least one security event rule in a plurality of security event rules, wherein the plurality of security event rules includes an email rule;
    blocking, by the network security system, the first network activity based on a determination that the first network activity triggers the at least one security event rule;
    determining, by the network security system, a sensitivity level associated with the first network activity based, at least in part, on the first network activity and the flags that are appended to the deserialized network activity data;
    determining whether the sensitivity level satisfies a threshold level of sensitivity;
    starting, by the network security system and only in response to a determination that the sensitivity level satisfies the threshold level of sensitivity, a timer configured to run for a timer window; and
    during the timer window, identifying subsequent network activity that is associated with the user device, wherein the subsequent network activity originates from the user device (i) after the first network activity is blocked by the network security system and (ii) while the timer runs for the predetermined timer window, wherein the identifying the subsequent network activity further comprises:
        monitoring, by the network security system, the subsequent network activity associated with the user device until the timer window expires;
        determining, by the network security system, that the subsequent network activity triggers the email rule in the plurality of security event rules based on:
            (i) analyzing information associated with the subsequent network activity to determine whether a file associated with the subsequent network activity is similar to a file associated with the blocked first network activity,
            (ii) identifying that the file associated with the subsequent network activity is being sent via a personal email service to an unknown email address based on a determination that the file associated with the subsequent network activity is similar to the file associated with the blocked first network activity, wherein the blocked first network activity was an attempt to send the file associated with the blocked first network activity via an email service within the network infrastructure, and
            (iii) determining that the subsequent network activity triggers the email rule based on the identification that the file associated with the subsequent network activity is being sent via the personal email service;
    associating, by the network security system, the blocked first network activity from the user device with the subsequent network activity from the user device to generate associated network activity based on the determination that the subsequent network activity triggers the email rule before the timer window expires; and
    generating, by the network security system and based on the associating, an alert indicating that the associated network activity is an attempt, by a user associated with the user device, to subvert the security wall within the network infrastructure.

2. The method of claim 1, further comprising determining, by the network security system, whether the first network activity triggers a quantity of the security event rules in the plurality of security event rules that exceeds a threshold amount.

3. The method of claim 2, further comprising starting, by the network security system, the timer based on the quantity of the security event rules exceeding the threshold amount.

4. The method of claim 1, wherein the threshold level of sensitivity is based on at least one of a file type, content in a file, a file size, a sensitivity type of data associated with a file, and a user associated with a file that corresponds to the first network activity.

5. The method of claim 4, further comprising determining, by the network security system, that the sensitivity level associated with the first network activity satisfies the threshold level of sensitivity based on a file corresponding to the first network activity having a sensitive file type.

6. The method of claim 4, further comprising determining, by the network security system, that the sensitivity level associated with the first network activity satisfies the threshold level of sensitivity based on a file corresponding to the first network activity having sensitive information.

7. The method of claim 4, further comprising determining, by the network security system, that the sensitivity level associated with the first network activity satisfies the threshold level of sensitivity based on a file corresponding to the first network activity having (i) a file type that satisfies a file type threshold and (ii) a size that exceeds a threshold file size.

8. The method of claim 4, further comprising determining, by the network security system, that the sensitivity level associated with the first network activity satisfies the threshold level of sensitivity based on a file corresponding to the first network activity being associated with a sensitive area in the network infrastructure, wherein the sensitive area includes at least one of human resources, finance, and customer information.

9. The method of claim 4, further comprising determining, by the network security system, that the sensitivity level associated with the first network activity satisfies the threshold level of sensitivity based on a user associated with the first network activity having at least a user risk score that exceeds a threshold risk score.

10. The method of claim 1, further comprising blocking, by the network security system, the subsequent network activity associated with the user device based on the determination that the subsequent network activity associated with the user device triggers the email rule.

11. The method of claim 1, further comprising adding, by the network security system, the associated network activity to a case file that corresponds to the user device.

12. The method of claim 1, further comprising transmitting, by the network security system, the alert to a computing device of a security analyst of the network infrastructure, wherein the computing device is configured to receive user input indicating an action to take in response to the alert.

13. The method of claim 1, wherein:
the plurality of security event rules includes a virtual machine (VM) rule, and the method further comprises determining, by the network security system, that the subsequent network activity triggers the VM rule based on:
analyzing information associated with the subsequent network activity to identify a number of hops between the user device and a destination device;
determining whether the number of hops exceeds a threshold level; and
determining that the subsequent network activity triggers the VM rule based on a determination that the number of hops exceeds the threshold level.

14. The method of claim 1, wherein:
the plurality of security event rules includes a proxy rule, and
the method further comprises determining, by the network security system, that the subsequent network activity triggers the proxy rule based on:
identifying that the file associated with the subsequent network activity is being sent to a computing device of an unauthorized recipient via a proxy based on the determination that the file associated with the subsequent network activity is similar to the file associated with the blocked first network activity, wherein the proxy is malware; and
determining that the subsequent network activity triggers the proxy rule based on an identification that the file associated with the subsequent network activity is sent via the proxy.

15. The method of claim 1, wherein:
the plurality of security event rules includes a local data storage device rule, and
the method further comprises determining, by the network security system, that the subsequent network activity triggers the local data storage device rule based on:
identifying that the file associated with the subsequent network activity is being downloaded to a local data storage device based on the determination that the file associated with the subsequent network activity is similar to the file associated with the blocked first network activity; and
determining that the subsequent network activity triggers the local data storage device rule based on an identification that the file associated with the subsequent network activity is being downloaded to the local data storage device.

16. The method of claim 1, wherein the blocked first network activity was an attempt to send the file associated with the blocked first network activity by a first user using the email service within the network infrastructure and the subsequent network activity was an attempt to send the file associated with the subsequent network activity by a second user using the personal email service.

17. A system for monitoring and identifying attempts to subvert a security wall within a network infrastructure, the system comprising:
at least one processor; and
a memory device storing instructions that are operable, when executed by the at least one processor one or more computers, to cause the at least one processor to perform operations comprising:
receiving network activity data for a first network activity for the network infrastructure that includes information identifying a user device from which the first network activity originates;
deserializing the network activity data of the first network activity;
appending flags corresponding to indicators of compromise to the deserializing network activity data;
determining, based on the flags that are appended to the deserialized network activity data, whether the first network activity triggers at least one security event rule in a plurality of security event rules, wherein the plurality of security event rules includes an email rule;
blocking the first network activity based on a determination that the first network activity triggers the at least one security event rule;
determining a sensitivity level associated with the first network activity based, at least in part, on the first network activity and the flags that are appended to the deserialized network activity data;
starting, only in response to a determination that the sensitivity level satisfies the threshold level of sensitivity, a timer configured to run for a timer window; and
during the timer window, identifying subsequent network activity that is associated with the user device, wherein the subsequent network activity originates from the user device (i) after the first network activity is blocked by the network security system and (ii) while the timer runs for the predetermined timer window, wherein wherein the identifying the subsequent network activity further comprises:

monitoring the subsequent network activity associated with the user device until the timer window expires;

determining that the subsequent network activity triggers the email rule in the plurality of security event rules based on:
- (i) analyzing information associated with the subsequent network activity to determine whether a file associated with the subsequent network activity is similar to a file associated with the blocked first network activity,
- (ii) identifying that the file associated with the subsequent network activity is being sent via a personal email service to an unknown email address based on a determination that the file associated with the subsequent network activity is similar to the file associated with the blocked first network activity, wherein the blocked first network activity was an attempt to send the file associated with the blocked first network activity via an email service within the network infrastructure, and
- (iii) determining that the subsequent network activity triggers the email rule based on the identification that the file associated with the subsequent network activity is being sent via the personal email service;

associating the blocked first network activity from the user device with the subsequent network activity from the user device to generate associated network activity based on the determination that the subsequent network activity triggers the email rule before the timer window expires; and generating, based on the associating, an alert indicating that the associated network activity is an attempt, by a user associated with the user device, to subvert the security wall within the network infrastructure.

18. The system of claim 17, wherein the system is a network security system configured to monitor and protect the network infrastructure.

19. The system of claim 17, wherein:
the plurality of security event rules includes a proxy rule, and
the operations further comprise determining, by the network security system, that the subsequent network activity triggers the proxy rule based on:
identifying that the file associated with the subsequent network activity is being sent to a computing device of an unauthorized recipient via a proxy based on the determination that the file associated with the subsequent network activity is similar to the file associated with the blocked first network activity, wherein the proxy is malware; and
determining that the subsequent network activity triggers the proxy rule based on an identification that the file associated with the subsequent network activity is sent via the proxy.

20. The system of claim 17, wherein:
the plurality of security event rules includes a virtual machine (VM) rule, and
the operations further comprise determining, by the network security system, that the subsequent network activity triggers the VM rule based on:
analyzing information associated with the subsequent network activity to identify a number of hops between the user device and a destination device;
determining whether the number of hops exceeds a threshold level; and
determining that the subsequent network activity triggers the VM rule based on a determination that the number of hops exceeds the threshold level.

* * * * *